US00RE46863E

(19) United States
(12) Reissued Patent
Huang

(10) Patent Number: US RE46,863 E
(45) Date of Reissued Patent: May 22, 2018

(54) TRANSMISSION DEVICE FOR PHOTOSENSITIVE DRUM

(71) Applicant: GENERAL PLASTIC INDUSTRIAL CO., LTD., Taichung (TW)

(72) Inventor: Shih-Chieh Huang, Taichung (TW)

(73) Assignee: GENERAL PLASTIC INDUSTRIAL CO., LTD., Taichung (TW)

(21) Appl. No.: 14/932,367

(22) Filed: Nov. 4, 2015

Related U.S. Patent Documents

Reissue of:
(64) Patent No.: 9,098,048
Issued: Aug. 4, 2015
Appl. No.: 14/310,615
Filed: Jun. 20, 2014

U.S. Applications:
(63) Continuation-in-part of application No. 13/965,856, filed on Aug. 13, 2013, now Pat. No. 9,031,465.

(30) Foreign Application Priority Data

Jul. 8, 2013 (TW) ..... 102124445

(51) Int. Cl.
*G03G 15/00* (2006.01)
*G03G 21/18* (2006.01)

(52) U.S. Cl.
CPC ..... *G03G 15/757* (2013.01); *G03G 21/1857* (2013.01); *G03G 2221/1657* (2013.01)

(58) Field of Classification Search
CPC ..... G03G 15/757; G03G 21/1857; G03G 221/1657; G03G 2215/00156; G03G 15/0142; G03G 21/1853; G03G 21/1839
See application file for complete search history.

(56) References Cited

U.S. PATENT DOCUMENTS 4,829,335 A * 5/1989 Kanemitsu ..... G03G 15/757 399/111
5,210,574 A 5/1993 Kita
(Continued)

FOREIGN PATENT DOCUMENTS

CN 201532527 U 7/2010
DE 202014100621 U1 6/2014
(Continued)

*Primary Examiner* — Sam Rimell
(74) *Attorney, Agent, or Firm* — Locke Lord LLP; Tim Tingkang Xia, Esq.

(57) ABSTRACT

A transmission device for a photosensitive drum includes a sleeve having at least one guiding groove, a transmission unit having a shaft disposed in the sleeve and capable of moving and rotating at the same time, an elastic member, and a gear member receiving the sleeve and the elastic member so that the elastic member exerts elastic force on the shaft of the transmission unit. The transmission unit has two engagement blocks and a receiving space between them. Each engagement block has an inclined outer surface, an inner surface, an inclined top surface and an engagement concave connecting the inner and outer surfaces. The engagement concaves are opened toward opposite directions for engagement with two pillars of a drive member of an electronic image forming apparatus respectively. As a result, the transmission device can be connected with and separated from the drive member smoothly.

26 Claims, 41 Drawing Sheets

(56) References Cited

U.S. PATENT DOCUMENTS

| | | | | |
|---|---|---|---|---|
| 5,845,175 | A * | 12/1998 | Kumar | F16D 1/0858 399/111 |
| 5,903,803 | A * | 5/1999 | Kawai | F16D 1/101 399/111 |
| 8,270,876 | B2 * | 9/2012 | Morioka et al. | 399/167 |
| 8,295,734 | B2 | 10/2012 | Ueno et al. | |
| 8,615,184 | B2 | 12/2013 | Zhou et al. | G03G 15/757 399/111 |
| 2006/0153587 | A1 | 7/2006 | Omura et al. | |
| 2008/0193156 | A1 | 8/2008 | Omura et al. | |
| 2011/0182619 | A1 * | 7/2011 | Batori et al. | 399/117 |
| 2011/0217073 | A1 * | 9/2011 | He | 399/111 |
| 2011/0255900 | A1 * | 10/2011 | Zhou et al. | 399/111 |
| 2012/0251175 | A1 * | 10/2012 | Peng et al. | 399/159 |
| 2012/0294649 | A1 * | 11/2012 | Kikuchi et al. | 399/117 |
| 2013/0322923 | A1 * | 12/2013 | Ikeda | 399/117 |
| 2014/0294499 | A1 | 10/2014 | Hallacher | |
| 2015/0030353 | A1 | 1/2015 | Wang | |

FOREIGN PATENT DOCUMENTS

| | | | |
|---|---|---|---|
| WO | 2012113289 | A1 | 8/2012 |
| WO | 2012113299 | A1 | 8/2012 |
| WO | 2012152203 | A1 | 11/2012 |

* cited by examiner (B)

(A)

(B)

(A)

TRANSMISSION DEVICE FOR PHOTOSENSITIVE DRUM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*This application is an application for reissue of U.S. Pat. No. 9,098,048, issued from U.S. patent application Ser. No. 14/310,615, filed Jun. 20, 2014, and claims foreign priority to and the benefit of Taiwan patent application No. TW102124445, filed Jul. 8, 2013 in the Intellectual Property Office of Taiwan (R.O.C.), each of which is hereby incorporated herein in its entirety by reference.*

This application is a continuation-in-part application of U.S. patent application Ser. No. 13/965,856, filed on Aug. 13, 2013, entitled "TRANSMISSION DEVICE FOR PHOTOSENSITIVE DRUM", by Shih-Chieh Huang, now [allowed] *U.S. Pat. No. 9,031,465, which is reissued with reissue application Ser. No. 14/811,004, filed Jul. 28, 2015, claiming foreign priority to and the benefit of Taiwan patent application No. TW102124445, filed Jul. 8, 2013 in the Intellectual Property Office of Taiwan (R.O.C.), each of* which is hereby incorporated herein in its entirety by reference.

Some references, which may include patents, patent applications, and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to photosensitive drums mounted in electronic imaging devices, such as printers, copy machines, and so on, and more particularly, to a transmission device for a photosensitive drum.

BACKGROUND OF THE INVENTION

The background description provided herein is for the purpose of generally presenting the context of the present invention. Work of the presently named inventors, to the extent it is described in this background section, as well as aspects of the description that may not otherwise qualify as prior art at the time of filing, are neither expressly nor impliedly admitted as prior art against the present invention.

A photosensitive drum, which is one of the most important components of an electronic imaging device, is installed in a toner cartridge to conduct electricity when photosensitized and attract carbon powders at the same time to develop the to-be-printed document. A photosensitive drum primarily comprises a photosensitive cylinder and a transmission device attached to an end of the photosensitive cylinder. The transmission device is adapted to be connected with a drive member in a housing of an electronic image forming apparatus to transmit rotatory kinetic energy from the drive member to the photosensitive cylinder.

The conventional transmission device for a photosensitive drum, which comprises a transmission member capable of engagement with the drive member, is usually provided with the design that the transmission member can be pushed by the drive member to swing, such as which disclosed in U.S. Pat. No. 8,295,734, or the design that the transmission member can be pushed by the drive member to move axially, such as which disclosed in China Utility Model Patent No. CN201532527U. By means of the designs, the transmission member will be engaged with the drive member when the user puts the toner cartridge into the electronic image forming apparatus and separated from the drive member when the user takes the toner cartridge out of the electronic imaging device.

However, the conventional transmission device for a photosensitive drum, which is provided with a transmission member capable of swinging or moving axially, is complicated in structure so as to be difficult in manufacture and assembly.

Therefore, a heretofore unaddressed need exists in the art to address the aforementioned deficiencies and inadequacies.

SUMMARY OF THE INVENTION

The present invention has been accomplished in view of the above-noted circumstances. It is an objective of the present invention to provide a transmission device for a photosensitive drum, which can be connected with and separated from a drive member of an electronic image forming apparatus in a different way from the conventional ones and is simpler in structure. It is another objective of the present invention to provide a transmission device for a photosensitive drum, which can be connected with a drive member of an electronic image forming apparatus firmly and separated from the drive member smoothly.

To attain the above objectives, the present invention provides a transmission device for a photosensitive drum, which is adapted for engagement with a drive member of an electronic image forming apparatus provided with two pillars.

In one aspect, the transmission device includes a transmission unit, a sleeve, a gear member and an elastic member.

In one embodiment, the transmission unit includes a shaft extending along an imaginary axis and having a first end facing toward a first direction, a second end facing toward a second direction opposite to the first direction, and at least one protrusion extending along a radial direction of the shaft. In one embodiment, the shaft of the transmission unit has an opening in which a pin is inserted. The protrusion is a part of the pin sticking out of the opening.

Further, the transmission unit also includes an engagement structure having a base extending from the first end of the shaft, two engagement blocks helically extending from two opposite sides of the base toward the first direction, and a receiving space defined between the engagement blocks for receiving the drive member.

In one embodiment, each engagement block has an outer surface extending gradually close to the imaginary axis toward the first direction, an inner surface facing the receiving space, an inclined top surface at a first junction between the outer surface and the inner surface, an engagement concave at a second junction between the outer surface and the inner surface, and a vertex located between the inclined top surface and the engagement concave, wherein an included angle between an extending direction of the inclined top surface and the imaginary axis is not equal to 90 degrees, and the engagement concaves of the engagement blocks are opened substantially toward opposite directions for allowing the pillars of the drive member to enter the engagement concaves through openings of the engagement concaves.

In one embodiment, the engagement concave of each engagement block of the transmission unit has a recess and a limiting surface located between the recess and the vertex and inclined substantially from the vertex toward the inclined top surface.

In one embodiment, the engagement structure of the transmission unit further comprises two guiding blocks extending from two other opposite sides of the base, wherein each said guiding block is provided with a guiding bevel extending gradually close to the imaginary axis toward the first direction.

In one embodiment, the base of the transmission unit is formed of a plate having an opening defined in a middle portion between the engagement blocks.

In one embodiment, the sleeve has a main body, an axial hole defined through the main body along the imaginary axis, and at least one guiding groove formed on the main body and communicated with the axial hole, the shaft of the transmission unit being disposed in the axial hole and capable of rotating and moving axially, and the at least one protrusion of the shaft being movably retained in the at least one guiding groove.

In one embodiment, the at least one guiding groove has a bottom side substantially perpendicular to the imaginary axis, and two lateral sides respectively extending from two ends of the bottom side toward to the first direction.

In one embodiment, the two lateral sides are gradually merged to define a vertex toward the first direction.

In one embodiment, the at least one guiding groove further has a top side connected between the two lateral sides.

In one embodiment, the top side is formed of an arc defining a vertex toward the first direction.

In one embodiment, the top side is parallel to the bottom side, and each of the two lateral sides has a first portion extending from a respective end of the bottom side and being parallel to the imaginary axis and a sloped portion extending from the first portion toward the imaginary axis, such that a length of the top side is shorter than that of the bottom side.

In one embodiment, the top side is parallel to the bottom side, and each of the two lateral sides and the bottom side define an angle less than 90 degrees but greater than zero degree, such that a length of the top side is shorter than that of the bottom side.

In one embodiment, the gear member is adapted for engaging with the photosensitive drum, and has a housing defined along the imaginary axis for receiving the main body of the sleeve so that the sleeve is coupled with the gear member unrotatably around the imaginary axis.

In one embodiment, the gear member has a top portion, a gear portion extending from the top portion along the imaginary axis toward the second direction, and a bottom portion extending from the gear portion along the imaginary axis) toward the second direction. In one embodiment, the top portion of the gear member has at least one slot.

In one embodiment, the sleeve further comprises two pillars protruding from the main body, and the gear member further has two limiting recesses being communicated with the housing for receiving the pillars of the sleeve. In one embodiment, the gear member further has an installation slot communicated with the limiting recesses and opened on the top wall.

In one embodiment, the sleeve further has a plurality of convexities protruding from the main body. The gear member further has a coupling portion protruding from the bottom wall toward the top wall. The coupling portion is an annular member having a coupling concave at a center thereof and provided with a plurality of through grooves extending along the imaginary axis. The sleeve is mounted in the coupling concave, and the convexities of the sleeve are inserted into the through grooves of the coupling portion movably.

In one embodiment, the main body of the sleeve has a bottom end and a plurality of slots concaved from the bottom end, and an elastic block is formed between every two adjacent said slots. The convexities of the sleeve are located at the elastic blocks.

In one embodiment, the coupling portion of the gear member has a top end and a plurality of slots concaved from the top end toward the bottom wall, and an elastic block is formed between every two adjacent said slots. The through grooves of the coupling portion are located at the elastic blocks.

In one embodiment, the bottom portion of the gear member has a fitting slot, and the bottom wall of the gear member, which is detachably mounted to the bottom portion, has a fitting block inlaid in the fitting slot.

In one embodiment, the main body of the sleeve has a relatively larger radius section and a relatively smaller radius section extending from the relatively larger radius section. The relatively larger radius section of the sleeve is provided with a limiting groove, and the at least one guiding groove is located at the relatively smaller radius section of the sleeve. The top wall of the gear member has a plurality of slots communicated with the housing in which a limiting block protrudes, and an elastic block is formed between every two adjacent said slots. Each elastic block has a stair; the relatively larger radius section of the sleeve is limited in the housing by the stairs. The limiting block is disposed in the limiting groove.

In one embodiment, an elastic member is disposed in the axial hole of the sleeve and has two ends abutted against a bottom wall of the gear member and the second end of the shaft of the transmission unit, respectively.

In one embodiment, the elastic member has a relatively larger radius section and a relatively smaller radius section extending from the relatively larger radius section. The relatively larger radius section is disposed in the housing of the gear member and has two ends abutted against the bottom wall of the gear member and the sleeve, respectively. The relatively smaller radius section is disposed in the axial hole of the sleeve and has an end abutted against the second end of the shaft of the transmission unit.

In another aspect, the invention relates to a transmission device for a photosensitive drum. In one embodiment, the transmission device includes a shaft having a first end, an opposing second end, and at least one protrusion extending along a radial direction of the shaft; an engagement portion having a base extending from the first end of the shaft, at least one engagement block helically extending from a side of the base toward a first direction, and a receiving space formed therein; a sleeve having a main body, an axial hole defined through the main body along an axis, and at least one guiding groove formed on the main body and communicated with the axial hole, wherein when the shaft is disposed in the axial hole, the shaft is rotatable and movable axially, and the at least one protrusion of the shaft is movably retained in the at least one guiding groove; a gear member for engaging with the photosensitive drum, having a housing formed for receiving the main body of the sleeve axially such that the sleeve is coupled with the gear member unrotatably around the axial axis; and an elastic member being disposed in the axial hole of the sleeve and having two ends abutted against a bottom wall of the gear member and the second end of the shaft, respectively.

In yet another aspect, the invention relates to a transmission device for a photosensitive drum. In one embodiment, the transmission device includes a gear member for engaging with the photosensitive drum, having a housing and a sleeve disposed in the housing, wherein the sleeve has a main body, an axial hole defined through the main body along an axis, and at least one guiding groove formed on the main body and communicated with the axial hole, and is coupled with the gear member unrotatably around the axis; an elastic member being disposed in the axial hole of the sleeve; and a transmission unit comprising a shaft having a first end, an opposing second end, and at least one protrusion extending along a radial direction of the shaft; and an engagement structure having a base extending from the first end of the shaft, at least one engagement block helically extending from a side of the base toward a first direction. The shaft is disposed in the axial hole of the sleeve, such that two ends of the elastic member are respectively abutted against a bottom wall of the gear member and the second end of the shaft, the shaft is rotatable and movable axially, and the at least one protrusion of the shaft is movably retained in the at least one guiding groove.

As a result, the transmission device for a photosensitive drum provided by the present invention is simpler in structure than the conventional ones, where the engagement concaves of the engagement structure can be engaged with the pillars of the drive member of the electronic image forming apparatus so that the transmission unit can be driven to rotate. Besides, when the user is going to connect the transmission device with the drive member of the electronic image forming apparatus or separate the transmission device from the drive member of the electronic imaging device, the engagement structure will be pushed by the drive member of the electronic image forming apparatus so that the transmission unit will move axially along the sleeve. At the same time, the protrusion of the shaft will be guided by the guiding grooves of the sleeve so that the transmission unit will rotate. As a result, the transmission unit can be connected with the drive member of the electronic image forming apparatus firmly and separated from the drive member smoothly by moving and rotating at the same time.

These and other aspects of the present invention will become apparent from the following description of the embodiment taken in conjunction with the following drawings, although variations and modifications therein may be affected without departing from the spirit and scope of the novel concepts of the present invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
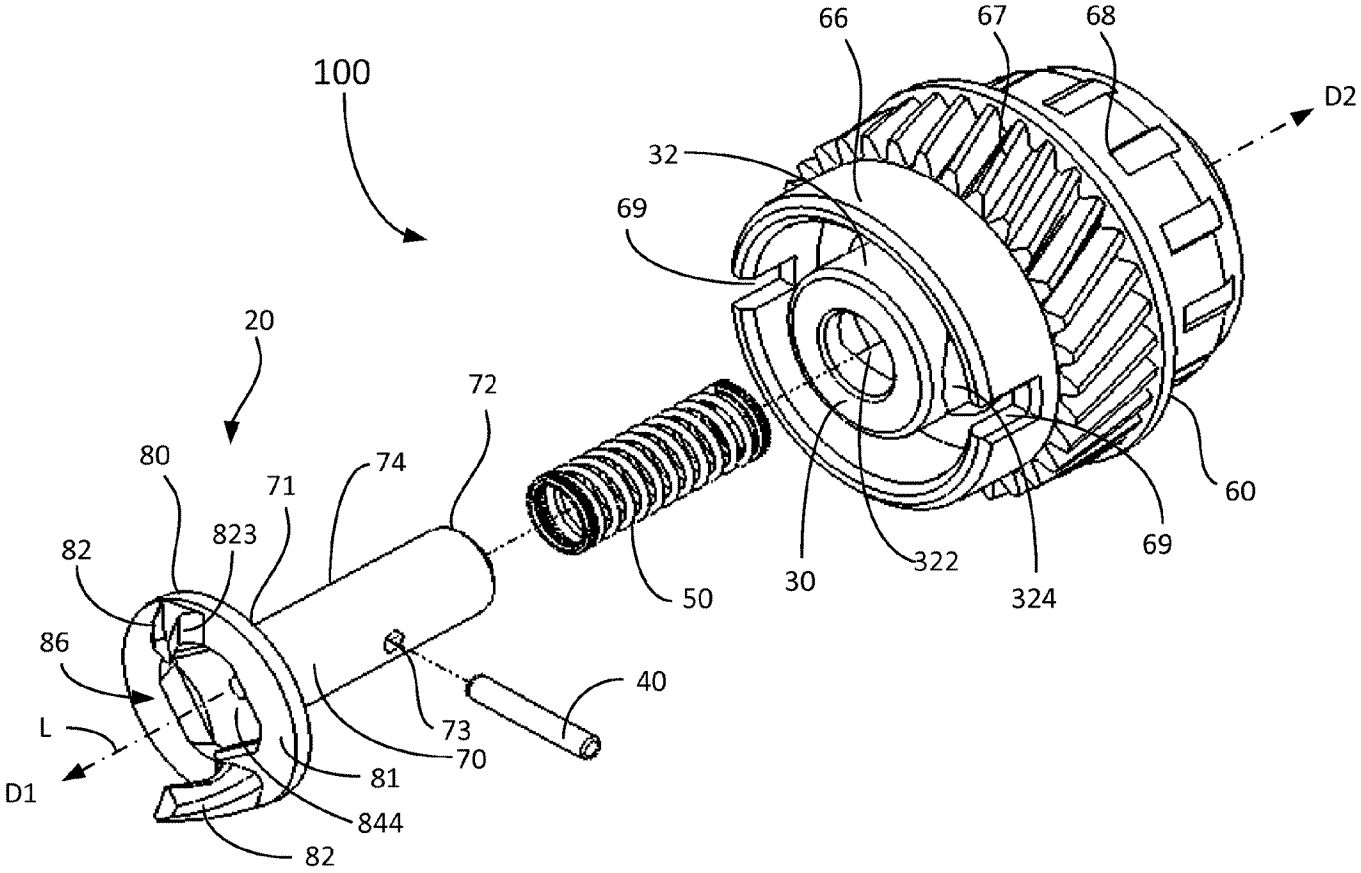
FIG. 1 shows an exploded perspective view of a transmission device for a photosensitive drum according to a first embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the FIGS. It will be understood that relative terms are intended to encompass different orientations of the device in addition to the orientation shown in the FIGS. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the terms "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

The description is now made as to the embodiments of the present invention in conjunction with the accompanying drawings. In accordance with the purposes of this invention, as embodied and broadly described herein, this invention relates to a transmission device for a photosensitive drum mounted in electronic imaging devices, such as printers, copy machines, and so on.

Referring to FIGS. 1-9, a transmission device 100 for a photosensitive drum, which is provided by a first embodiment of the present invention, comprises a transmission unit 20, a sleeve 30, an elastic member 50, and a gear member 60.

Figure 2:
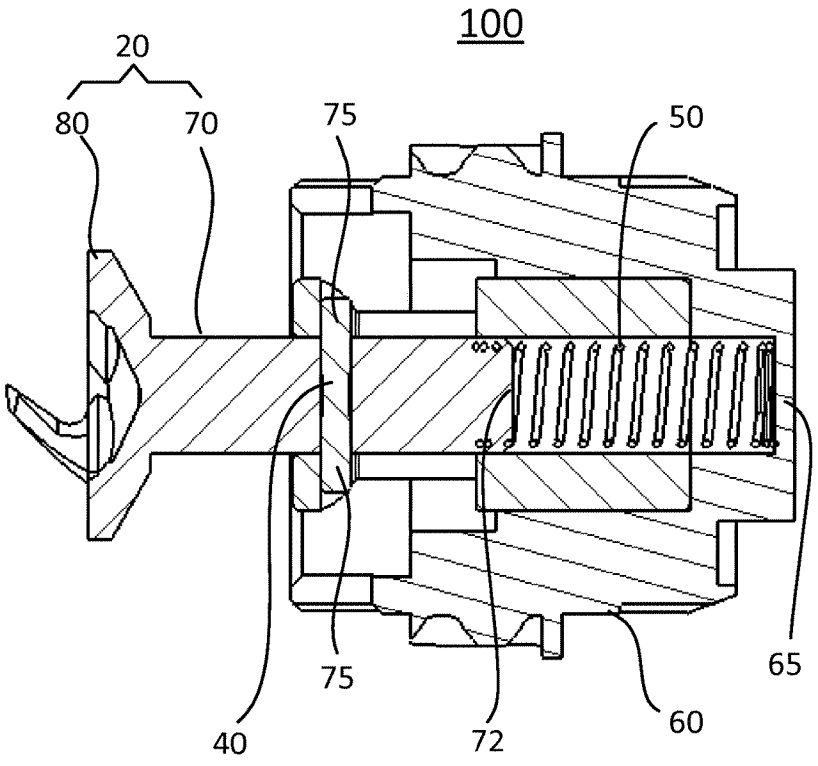
FIG. 2 shows the transmission device according to the first embodiment of the present invention, (A) a perspective view, and (B) a cross-section view.
Figure 2:
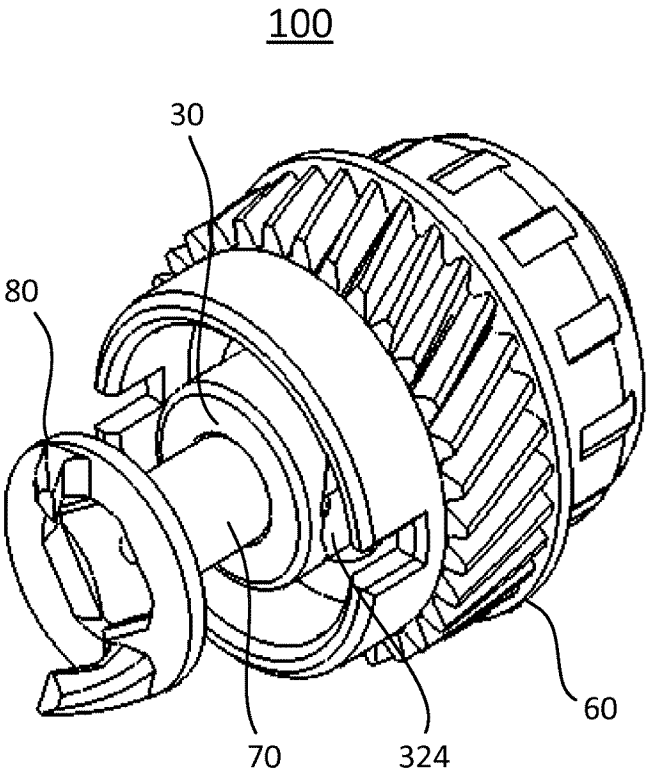
Figure 3:
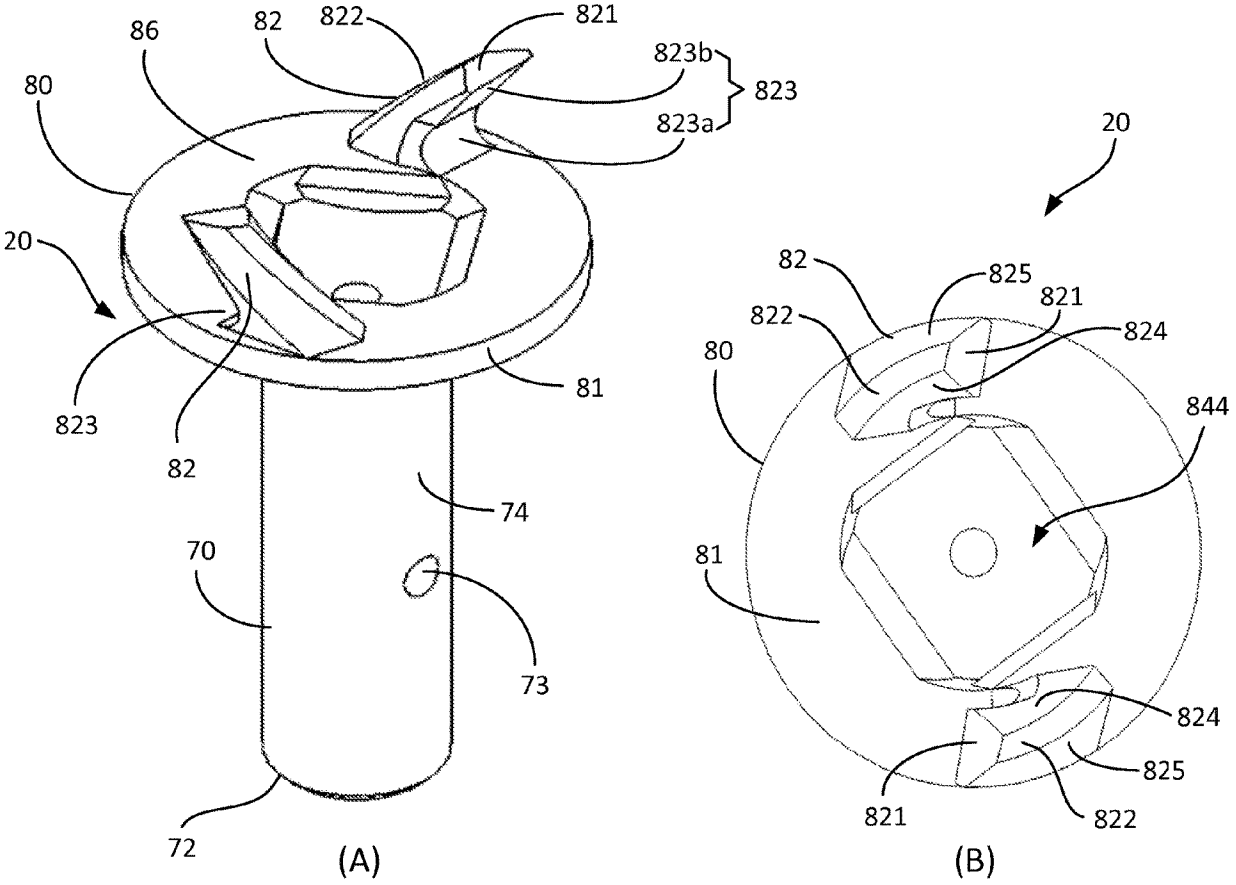
FIG. 3 shows a transmission unit of the transmission device for a photosensitive drum according to the first embodiment of the present invention, (A) a perspective view, and (B) a top view.

As shown in FIGS. 1-3, the transmission unit 20 comprises a shaft 70 and an engagement structure 80. The shaft 70 comprises a cylindrical shaft body 74 and at least one protrusion 75 extending along a radial direction of the cylindrical shaft body 74. The shaft body 74 is an elongated element extending along an imaginary axis L and provided with a first end 71 facing toward a first direction D1, a second end 72 facing toward a second direction D2 opposite to the first direction D1, and an opening 73 penetrating through the main portion of the shaft body 74 along its radial direction. In one embodiment, a pin 40 is inserted into the opening 73 when assembled, where the protrusion 75 is a part of the pin 40 sticking out of the opening 73.

Figure 42:
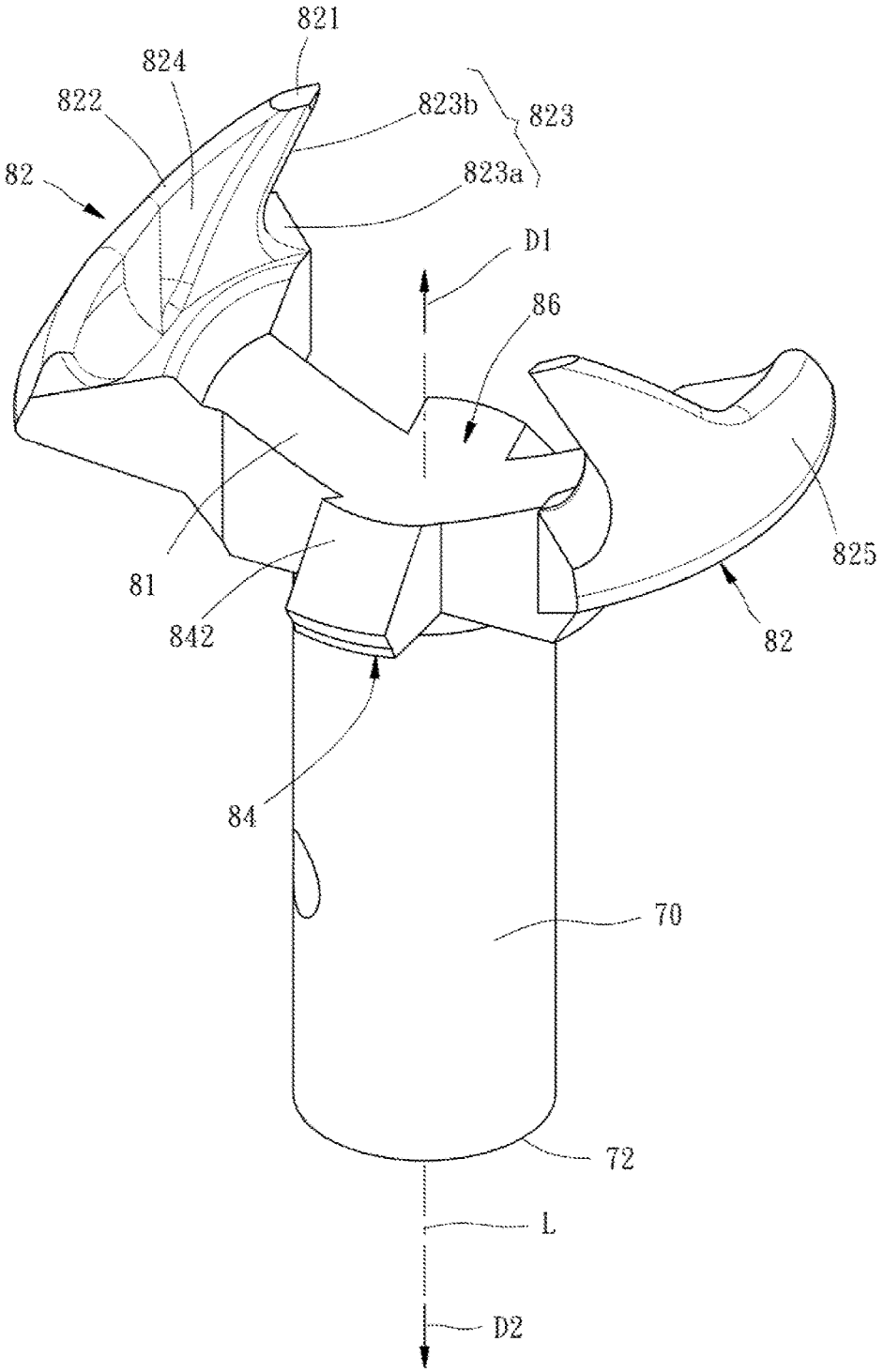
FIG. 42 shows a perspective view of a transmission unit of the transmission device for a photosensitive drum according to one embodiment of the present invention.

The engagement structure 80 comprises a base 81 extending from the first end 71 of the shaft 70 integrally, two engagement blocks 82 helically extending from two opposite sides of the base 81 toward the first direction D1, and a receiving space 86 defined between the engagement blocks 82 for receiving the drive member 90. In one embodiment, as shown in FIGS. 1-3, the base 81 of the transmission unit 20 is formed of a plate having an opening 844 defined in a middle portion between the engagement blocks 82. In certain embodiments, as shown in FIG. 42, the engagement structure 80 of the transmission unit 20 may further comprise two guiding blocks 84 extending from two other opposite sides of the base 81. Each said guiding block 84 is provided with a guiding bevel 842 extending gradually close to the imaginary axis toward the first direction D1.

The engagement blocks 82 are configured extending helically from two opposite sides of the base 8, respectively, which are about the upside and the downside of the base 81 shown in FIG. 1, away from the imaginary axis L and toward the first direction D1. As shown in FIGS. 3A and 3B, each engagement block 82 has an outer surface 825 extending gradually close to the imaginary axis L toward the first direction D1, an inner surface 824 facing the receiving space 86, an inclined top surface 822 at a junction between the outer surface 825 and the inner surface 824, an engagement concave 823 at another junction between the outer surface 825 and the inner surface 824, and a vertex 821 located between the inclined top surface 822 and the engagement concave 823. The included angle between the extending direction of the inclined top surface 822 and the imaginary axis L is about 30 to 80 degrees. The engagement concaves 823 of the engagement blocks 82 are opened substantially toward opposite directions for allowing the pillars 92 of the drive member 90 to enter the engagement concaves 823 through openings of the engagement concaves 823. Each engagement concave 823 has an arched recess 823a and a limiting surface 823b located between the recess 823a and the vertex 821 and substantially inclined from the vertex 821 toward the inclined top surface 822. The engagement concaves 823 of the engagement blocks 82 are opened substantially toward opposite directions.

Figure 4:
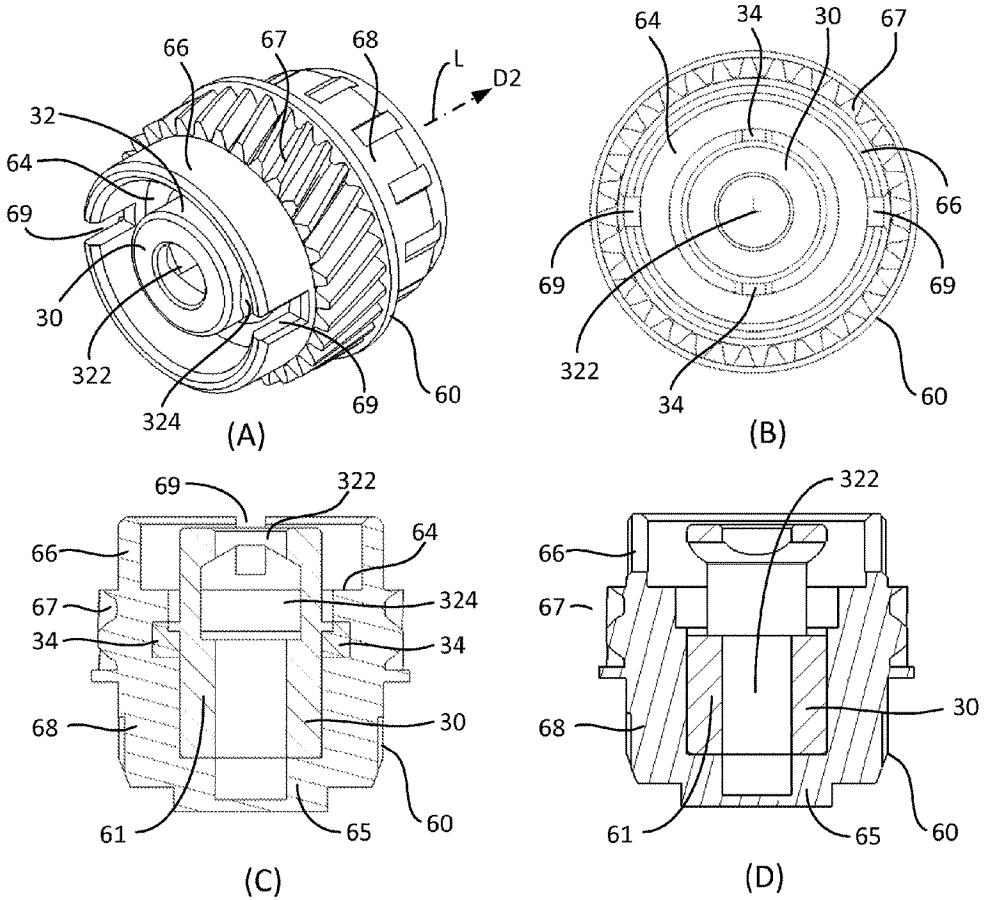
FIG. 4 shows a gear member and a sleeve assembled in the gear member of the transmission device for a photosensitive drum according to the first embodiment of the present invention, (A) a perspective view, (B) a top view, (C) a cross-section view, and (D) another cross-section view.
Figure 5:
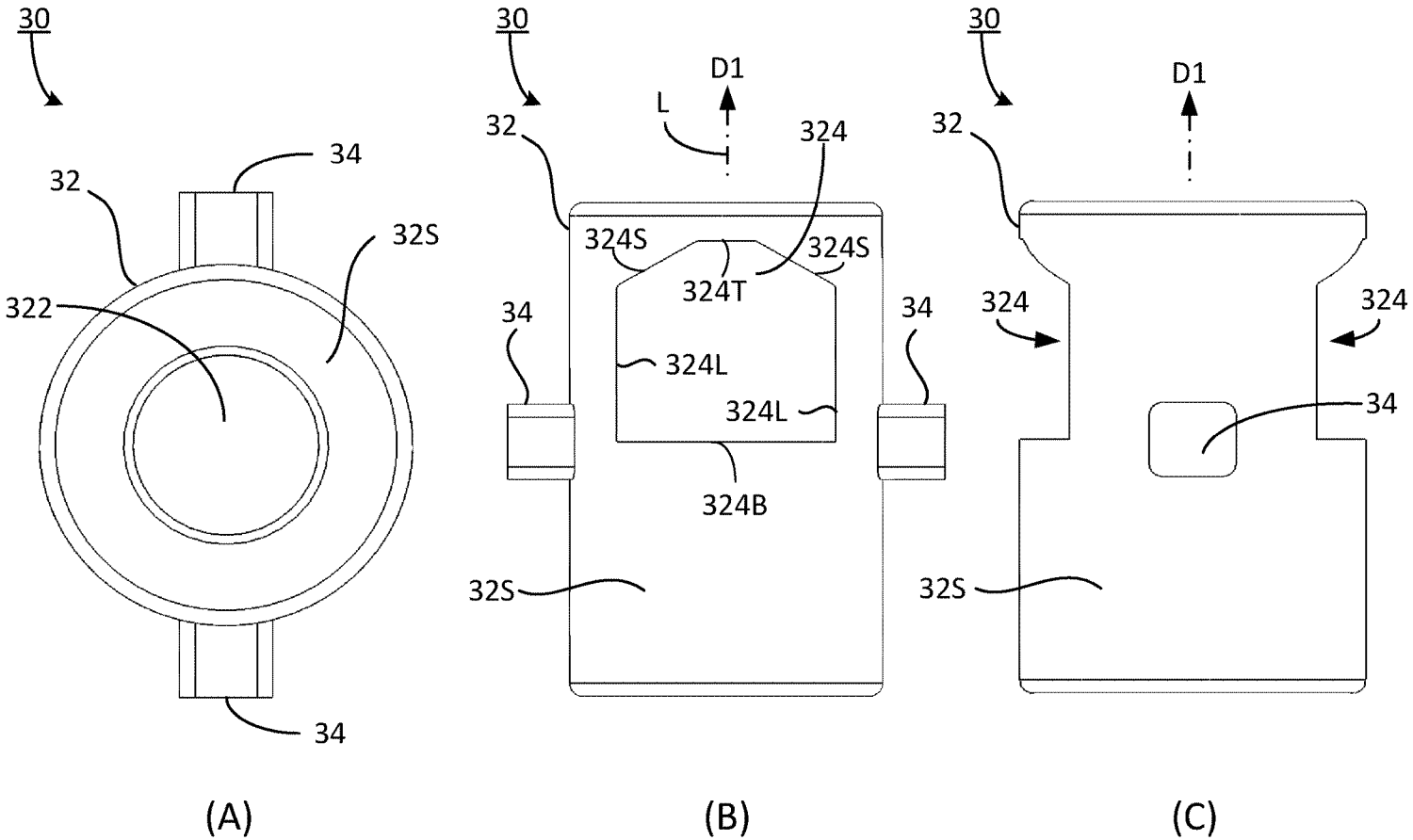
FIG. 5 shows a sleeve of the transmission device for a photosensitive drum according to the first embodiment of the present invention, (A) a top view, (B) a cross-section view, and (C) another cross-section view.

Referring to FIGS. 1-6, and particularly to FIG. 5, the sleeve 30 comprises a main body 32 *having a sidewall 32S along the imaginary axis L*, an axial hole 322 defined [through] *by the sidewall 32S of* the main body 32 along the imaginary axis L, two guiding grooves 324 formed on *the sidewall 32S of* the main body 32 *and being through the sidewall 32S of the main body 32*, communicated with the axial hole 322, and two pillars 34 protruding from *the sidewall 32S of* the main body 32. Only one of the guiding grooves 324 is shown in the figures, and the other groove 324 is located opposite to the groove 324 shown in the figures.

As shown in FIG. 5, each guiding groove 324 has a bottom side 324B substantially perpendicular to the imaginary axis L, two lateral sides respectively extending from two ends of the bottom side 324B toward to the first direction D1, and a top side 324T connected between the two lateral sides. The top side 324T is parallel to the bottom side 324B. Each of the two lateral sides has a first portion 324L extending from a respective end of the bottom side 324B and is parallel to the imaginary axis L, and a sloped portion 324S extending from the first portion toward the imaginary axis L, such that a length of the top side 324 is shorter than that of the bottom side 324B.

FIGS. 6A-6E show different embodiments of sleeves, respectively. Each sleeve can be used in the transmission device 100 for a photosensitive drum according to the first embodiment of the present invention. Specifically, the sleeves are essentially the same, except that the guiding grooves are different from each other. The guiding groove 324a of the sleeve shown in FIG. 6A is identical to the guiding groove 324 of the sleeve 30 shown in FIG. 5. For the guiding grooves 324b, 324c, 324e and 324f of the sleeves respectively shown in FIGS. 6B, 6C, 6E and 6F, the top side is formed of an arc defining a vertex Vb, Vc, Ve, or Vf, toward the first direction D1. The arc can be a circular arc, an oval/ellipse arc, or the likes. In one embodiment, the two lateral sides of a guiding groove may be gradually merged to define a vertex toward the first direction D1, as shown in FIGS. 6E and 6F. In another embodiment, the top side of a guiding groove is parallel to the bottom side of the guiding groove, and each of the two lateral sides and the bottom side of the guiding groove define an angle less than 90 degrees but greater than zero degree, such that a length of the top side is shorter than that of the bottom side, as shown in FIG. 6D. It should be appreciated to one skilled in the art that other types of guiding grooves can also be utilized to practice the present invention.

According to the invention, as assembled, the shaft 70 of the transmission unit 20 is disposed in the axial hole 322 and capable of rotating and moving axially. The pin 40 is inserted into the opening 73 of the transmission unit 20 in such a way that the shaft 70 of the transmission unit 20 has two protrusions 75 extending along the shaft's radial direction, as shown in FIG. 2B. The protrusions 75, which are formed by the two parts of the pin 40 that protrude out of the opening 73, are movably received in the guiding grooves 324, respectively.

It should be appreciated to one skilled in the art that the opening 73 of the transmission unit 20 can also be provided without penetrating the shaft 70. For example, the shaft 70 of the transmission unit 20 may have only one protrusion 75 and the sleeve 30 only needs to be provided with one guiding groove 324. Besides, the protrusion 75 of the shaft 70 is not limited to be formed by the pin 40 inserted into the opening 73. For example, the protrusion 75 can be protruded from the shaft body 74 integrally; in that condition, the guiding groove 324 should have an open end so that the protrusion 75 can enter the guiding groove 324 through its open end, and the open end of the guiding groove 324 should be capped by an annular cap provided at, but not limited to, the shaft 70.

Referring to FIGS. 1, 2 and 4, the gear member 60 is adapted for engaging with the photosensitive drum and has a top portion 66, a gear portion 67 extending from the top portion 66 along the imaginary axis L toward the second direction D2, a bottom portion 68 extending from the gear portion 67 along the imaginary axis L toward the second direction D2, a top wall 64 located at the side of the top portion 66, and a bottom wall 65 located at the side of the bottom portion 68. In addition, the top portion 66 of the gear member 60 may have at least one slot 69. The peripheral configuration of the gear member 60 is similar to the conventional ones. Inside the gear member 60, there is a housing 61 defined along the imaginary axis L for receiving the main body 32 of the sleeve 30 so that the sleeve 30 is coupled with the gear member 60 unrotatably around the imaginary axis L. In the first embodiment of the transmission device 100 for a photosensitive drum, the sleeve 30 is molded in the gear member 60.

In certain embodiments, the gear member 60 has an installation slot formed on the top wall 64, and two limiting recesses communicated with each other. The housing 61 extends along the imaginary axis L and opened on the top wall 64. The installation slot extends from the housing 61 toward the two opposite radial directions of the housing 61 and opened on the top wall 64. The limiting recesses are located adjacent to the installation slot, extending parallel to the imaginary axis L and not opened on the top wall 64. The sleeve 30 may further have two pillars 34 protruding from the main body 32. In assembly, the two pillars 34 of the sleeve 30 are inserted into the housing 61 through the installation slot, and then the sleeve 30 is turned to cause the pillars 34 to enter the limiting recesses so that the sleeve 30 is limited in the gear member 60. The details of such embodiments are disclosed in the pending U.S. patent application Ser. No. 13/965,856, which is hereby incorporated herein in its entirety by reference, and not repeated herein.

According to the invention, the assembly process of the transmission device is very simple. First, the elastic member 50 is disposed in the axial hole 322 of the sleeve 30, as shown in FIG. 9A. The axial hole 322 of the sleeve 30 is in communication with the housing 61 of the gear member 60. Then, the shaft 70 of the transmission unit 20 is inserted in the axial hole 322 of the sleeve 30, as shown in FIG. 9B. Next, the pin 40 is inserted into the opening 73 of the shaft 70 of the transmission unit 20 through the through slots 69 of the gear member 60 and the guiding grooves 324 of the sleeve 30. As such, the two end portions (i.e., protrusions 75) of the pin 40 are retained and moveably limited in the guiding grooves 324, and two ends of the elastic member 50 are abutted against the bottom wall 65 of the gear member 60 and the second end 72 of the shaft 70 of the transmission unit 20, respectively, so that a force generated by the elastic member 50 exerts on the second end 72 of the shaft 70 of the transmission unit 20 along the imaginary axis L, which makes the pin 40 (i.e., protrusions 75) of the shaft 70 in a position against the top side or vertex of the guiding grooves 324 of the sleeve 30 in a normal state of the transmission device.

When the transmission device 100 is used, the gear member 60 is fastened to a photosensitive drum which is adapted for installation in a toner cartridge (not shown), and the engagement structure 80 of the transmission unit 20 sticks out of an end of the toner cartridge. When the user puts the toner cartridge into a housing of an electronic image forming apparatus (not shown), the engagement structure 80 of the transmission unit 20 will be engaged with a drive member 90 (shown in FIGS. 10-24) located in the housing in such a way that a part of the drive member 90 is received in the receiving space 86 and the engagement concaves 823 are received and engaged with two pillars 92 of the drive member 90 respectively so that the photosensitive drum will be driven to rotate by the drive member 90.

FIGS. 10-14 shows a process how the transmission device 100 for a photosensitive drum according to the first embodiment of the present invention is connected with a drive member 90, wherein the engagement blocks 82 are hereinafter denoted as a first engagement block 82A and a second engagement block 82B for the convenience of illustrating the engaging process more clearly.

As shown in FIGS. 10 and 11A-11D, the outer surface 825 of the first engagement block 82A is touched by the drive member 90, where the pin 40 (i.e., protrusions 75) of the shaft 70 is in the middle position against the top side or vertex of the guiding grooves 324 of the sleeve 30. At this time, the gear member 60 rotates counterclockwise and the transmission unit 20 pushes the drive member 90 toward the first direction D1, which makes the pin 40 of the shaft 70 translate along the top side of the guiding groove 324 first and then slide down along one sloped portion of the lateral sides of the guiding groove 324 toward the second direction D2, as shown in FIG. 12A-12D, where the elastic member 50 is compressed toward the bottom wall 65 of the gear member 60, as shown in FIG. 12B. When the transmission unit 20 continuously pushes the drive member 90, the pin 40 of the shaft 70 continuously moves in the guiding groove 324 toward the second direction D2, as shown in FIGS. 13A-13C, and meanwhile, the elastic member 50 is further compressed toward the bottom wall 65 of the gear member 60, as shown in FIG. 13B, which make the drive member 90 slide into the receiving space 86 of the transmission unit 20. When the drive member 90 is received in the receiving space 86 of the transmission unit 20, the compressed force generated by the elastic member 50 pushes the shaft 70 and makes the pin 40 of the shaft 70 back in the middle position against the top side or vertex of the guiding grooves 324 of the sleeve 30, where the engagement concaves 823 are engaged respectively with the pillars 92 of the drive member 90, as shown in FIGS. 14A-14C.

The foregoing process is equivalent to the process of which the drive member 90 pushes the transmission unit 20 toward the gear member 60, i.e., toward the second direction D2, to make the transmission unit 20 rotates clockwise and move inwards along the axial hole 322 of the sleeve 30, and the protrusions 75 are guided by the guiding grooves 324 of the sleeve 30 to cause the transmission unit 20 to rotate so that one of the pillars 92 of the drive member 90 slides along the inclined top surface 822 of the first engagement block 82A, and passes over the vertex 821 of the first engagement block 82A. After that, the transmission unit 20 is no longer pushed by the drive member 90 so as to be forced by the elastic rebound force generated by the relatively smaller radius section 52 to move outwards along the axial hole 322 of the sleeve 30, i.e., toward the first direction D1, and rotate at the same time. Then, the engagement concaves 823 are engaged with the pillars 92 of the drive member 90 respectively.

As a result, when the drive member 90 rotates counterclockwise, the pillars 92 will push the engagement blocks 82A and 82B respectively to drive the transmission device 100 rotate counterclockwise, too. At this time, the engagement between the engagement concaves 823 and the pillars 92 causes the rotating transmission unit 20 unable to move inwards along the axial hole 322 of the sleeve 30, i.e., toward the second direction D2 so the drive member 90 will drive the transmission device 100 to rotate continuously. It should be appreciated to one skilled in the art that the pillars 92 of the drive member 90 abut against the recesses 823a of the engagement concaves 823 in FIG. 14, but also can be set to abut against the limiting surfaces 823b of the engagement concaves 823. The two conditions both can result in the transmission effect, which means the transmission device 100 can be driven to rotate no matter the pillars 92 of the drive member 90 abut against the recesses 823a or the limiting surfaces 823b.

FIGS. 15-19 show another process how the transmission device 100 for a photosensitive drum according to the first embodiment of the present invention is connected with a drive member 90. The process is opposite to the forgoing process shown in FIGS. 10-14.

As shown in FIGS. 15 and 16A-16D, the outer surface 825 of the first engagement block 82A is touched by the drive member 90, where the pin 40 of the shaft 70 is in the middle position against the top side or vertex of the guiding grooves 324 of the sleeve 30. At this time, the gear member 60 rotates clockwise and the transmission unit 20 pushes the drive member 90 toward the first direction D1, which makes the pin 40 of the shaft 70 translate along the top side of the guiding groove 324 first and then slide down along the other sloped portion of the lateral sides of the guiding groove 324 toward the second direction D2, as shown in FIG. 17A-17C, where the elastic member 50 is compressed toward the bottom wall 65 of the gear member 60. When the transmission unit 20 continuously pushes the drive member 90, the pin 40 of the shaft 70 continuously moves in the guiding groove 324 toward the second direction D2, as shown in FIGS. 18A-18B, and meanwhile, the elastic member 50 is further compressed toward the bottom wall 65 of the gear member 60, as shown in FIG. 18A, which make the drive member 90 slide into the receiving space 86 of the transmission unit 20. When the drive member 90 is received in the receiving space 86 of the transmission unit 20, the compressed force generated by the elastic member 50 pushes the shaft 70 and makes the pin 40 of the shaft 70 back in the middle position against the top side or vertex of the guiding grooves 324 of the sleeve 30, where the engagement concaves 823 are engaged respectively with the pillars 92 of the drive member 90, as shown in FIGS. 19A-19C.

FIGS. 20-24 show yet another process how the transmission device 100 for a photosensitive drum according to the first embodiment of the present invention is connected with a drive member 90.

Figure 23:
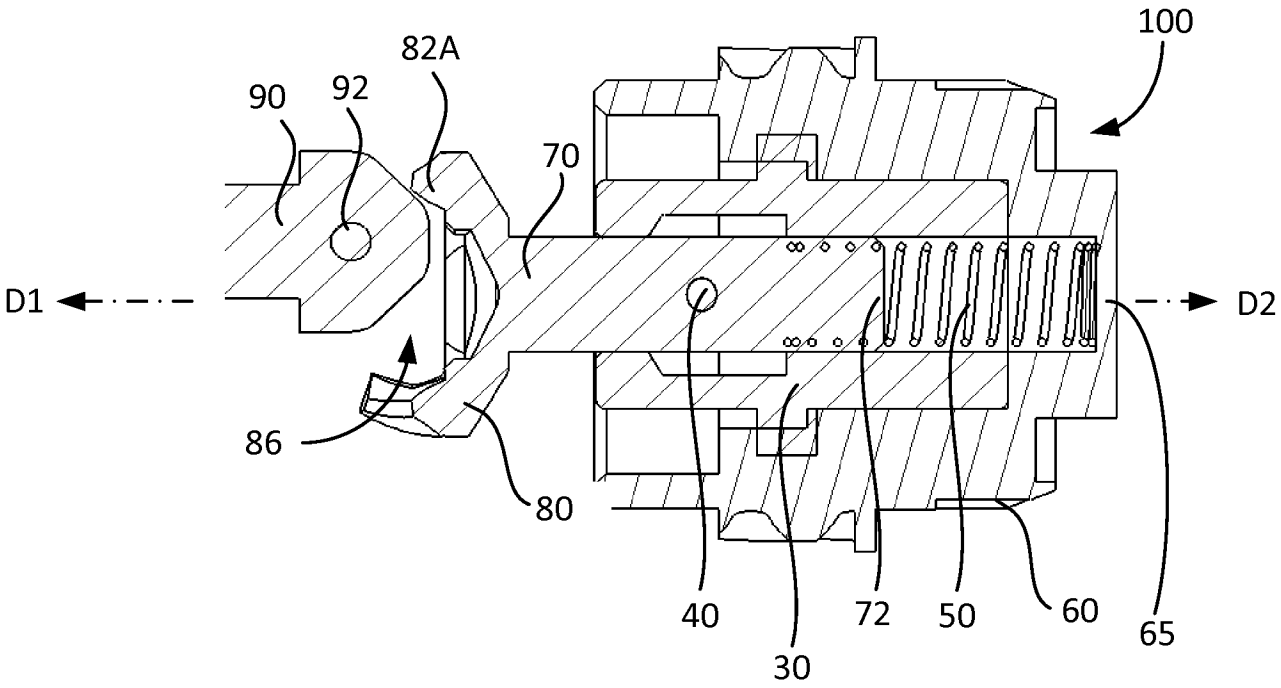
Figure 24:
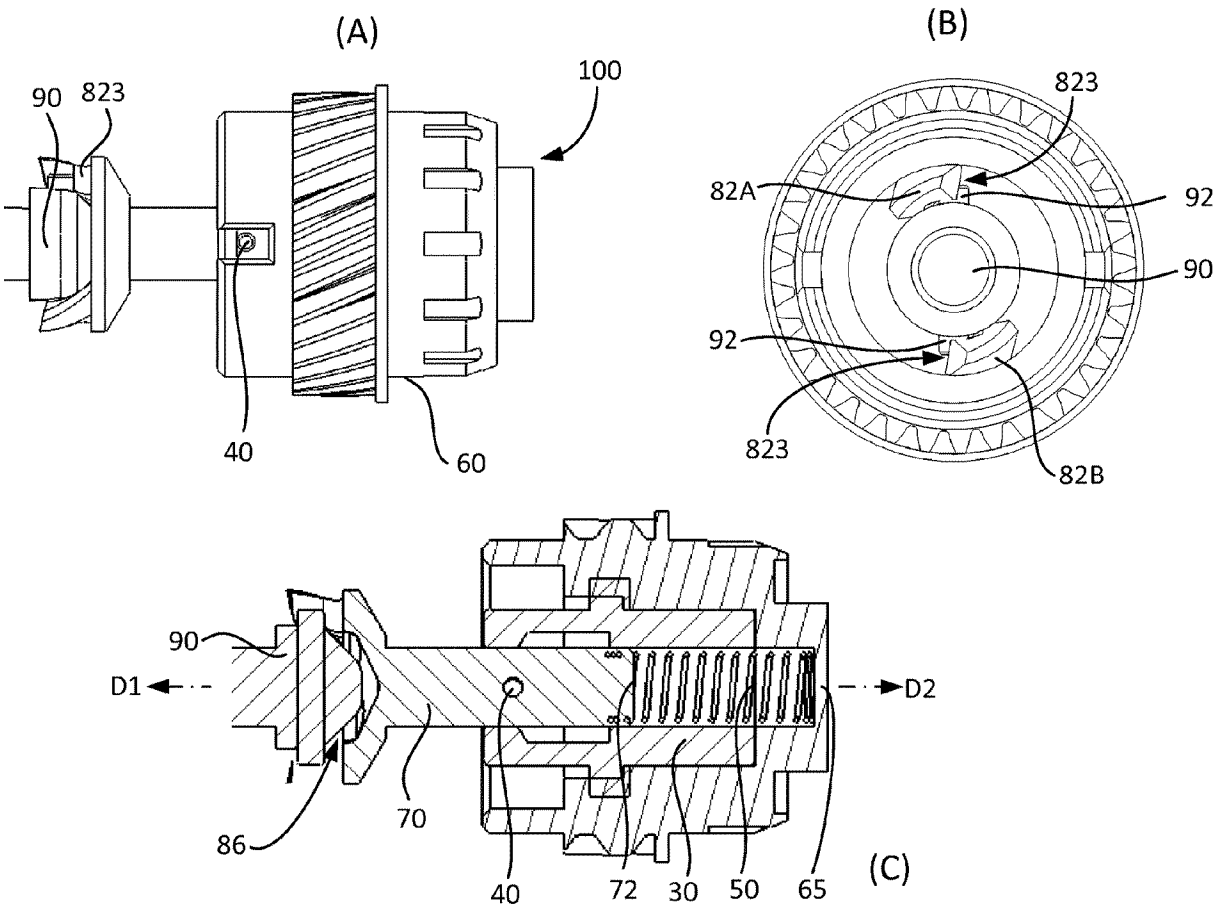

As shown in FIGS. 20 and 21A-21D, the base 81 of the first engagement block 82A is touched by the drive member 90, where the pin 40 of the shaft 70 is in the middle position against the top side or vertex of the guiding grooves 324 of the sleeve 30. At this time, the transmission unit 20 pushes the drive member 90 toward the first direction D1, which makes the pin 40 of the shaft 70 move down in the guiding groove 324 toward the second direction D2, as shown in FIG. 22A-22B, where the elastic member 50 is compressed toward the bottom wall 65 of the gear member 60. When the transmission unit 20 continuously pushes the drive member 90, the pin 40 of the shaft 70 continuously moves down in the guiding groove 324 toward the second direction D2, as shown in FIG. 23, and meanwhile, the elastic member 50 is further compressed toward the bottom wall 65 of the gear member 60, as shown in FIG. 23, which make the drive member 90 slide into the receiving space 86 of the transmission unit 20. When the drive member 90 is received in the receiving space 86 of the transmission unit 20, the compressed force generated by the elastic member 50 pushes the shaft 70 and makes the pin 40 of the shaft 70 back in the middle position against the top side or vertex of the guiding grooves 324 of the sleeve 30, where the engagement concaves 823 are engaged respectively with the pillars 92 of the drive member 90, as shown in FIGS. 24A-24C.

Figure 25:
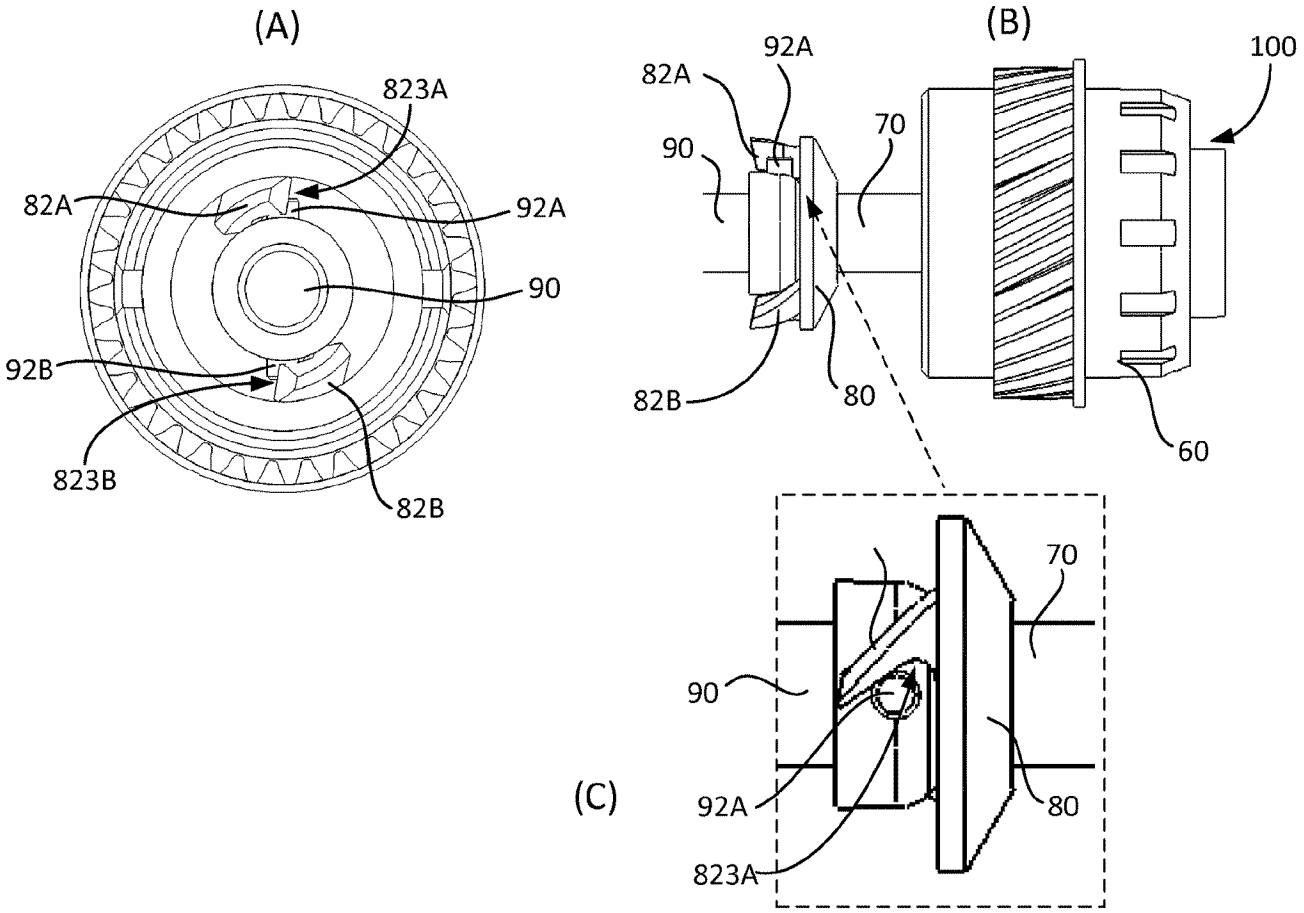
FIGS. 25-28 are views showing a process how the transmission device for a photosensitive drum according to the first embodiment of the present invention is separated from the drive member.
Figure 26:
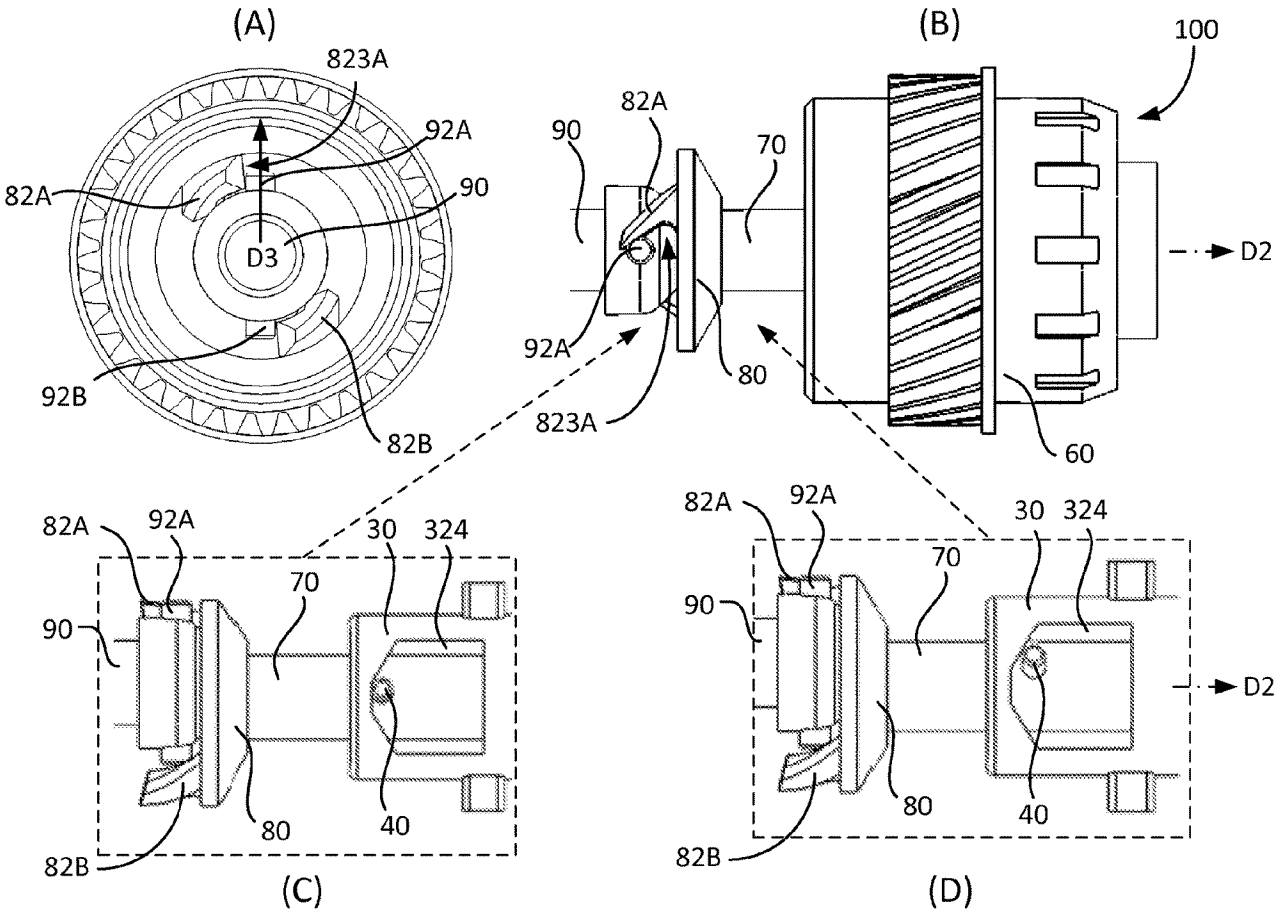
Figure 27:
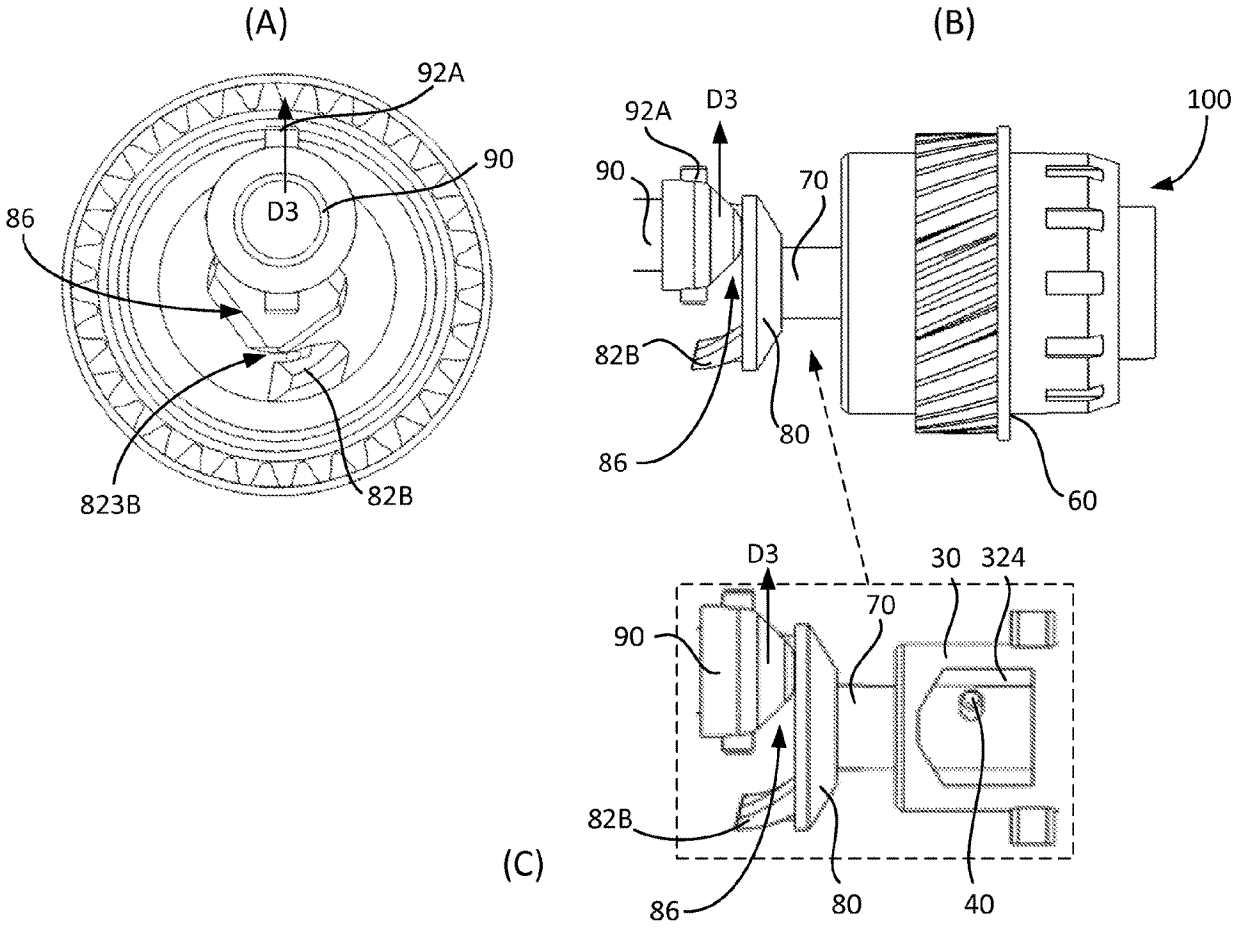
Figure 28:
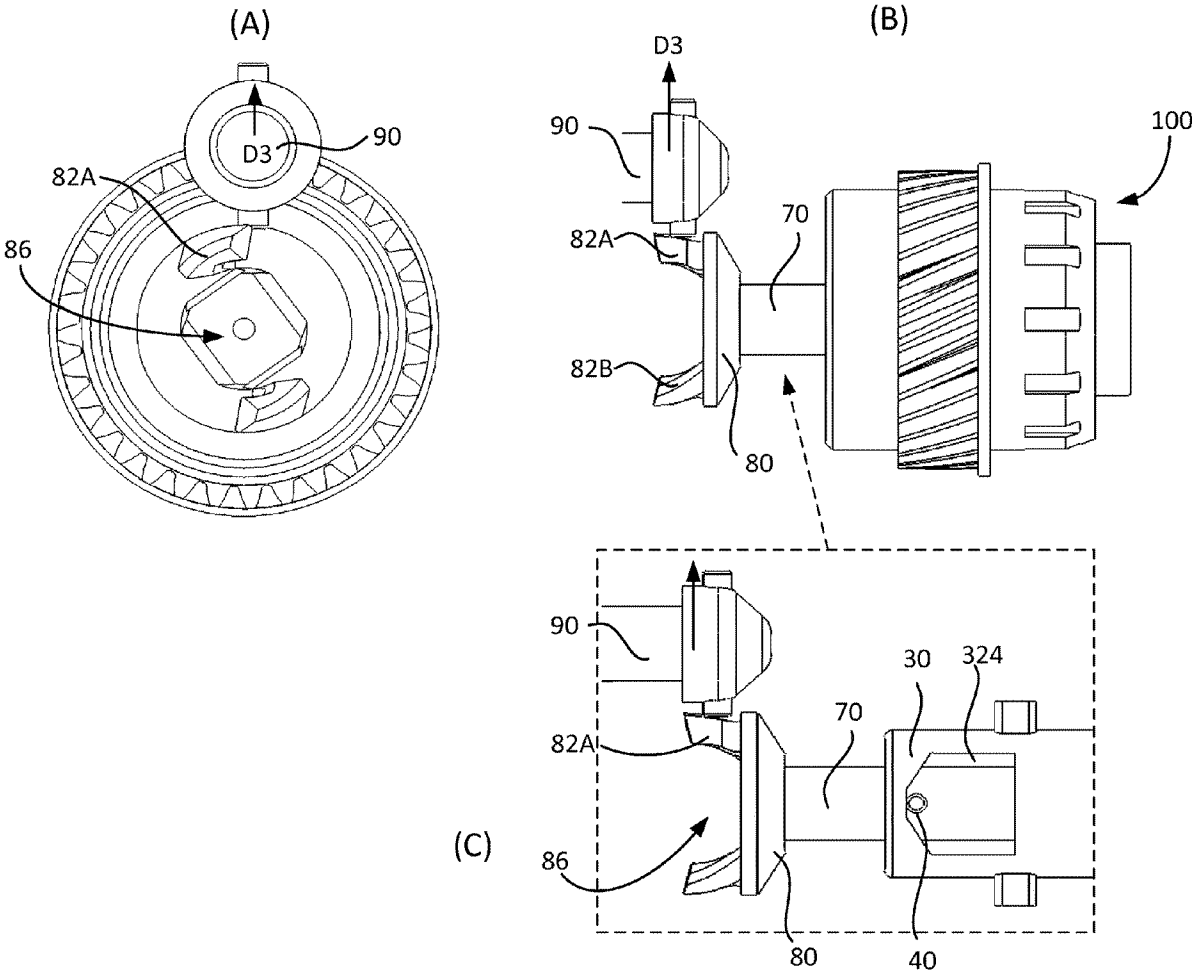
Figure 29:
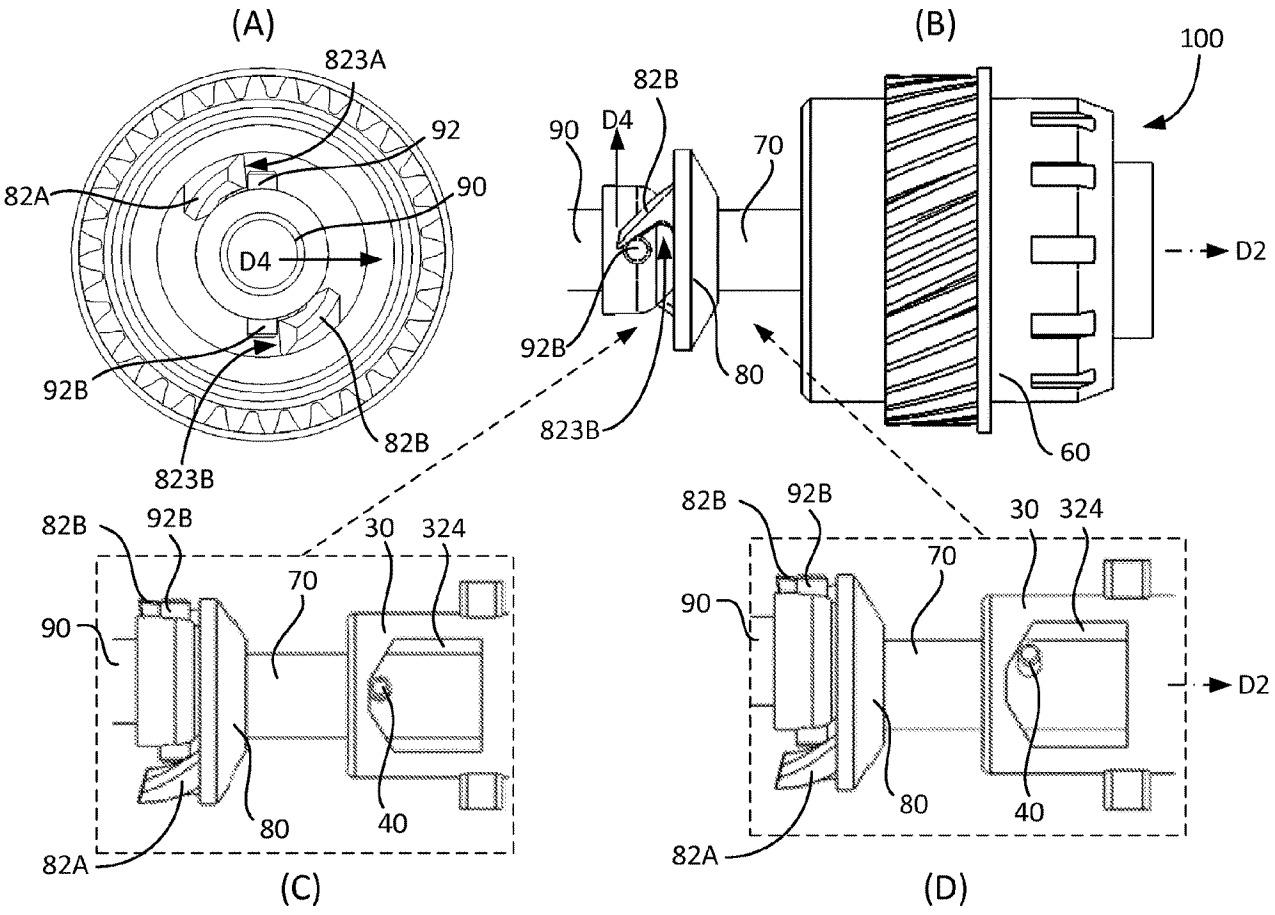
FIGS. 29-32 are views showing another process how the transmission device for a photosensitive drum according to the first embodiment of the present invention is separated from the drive member.
Figure 30:
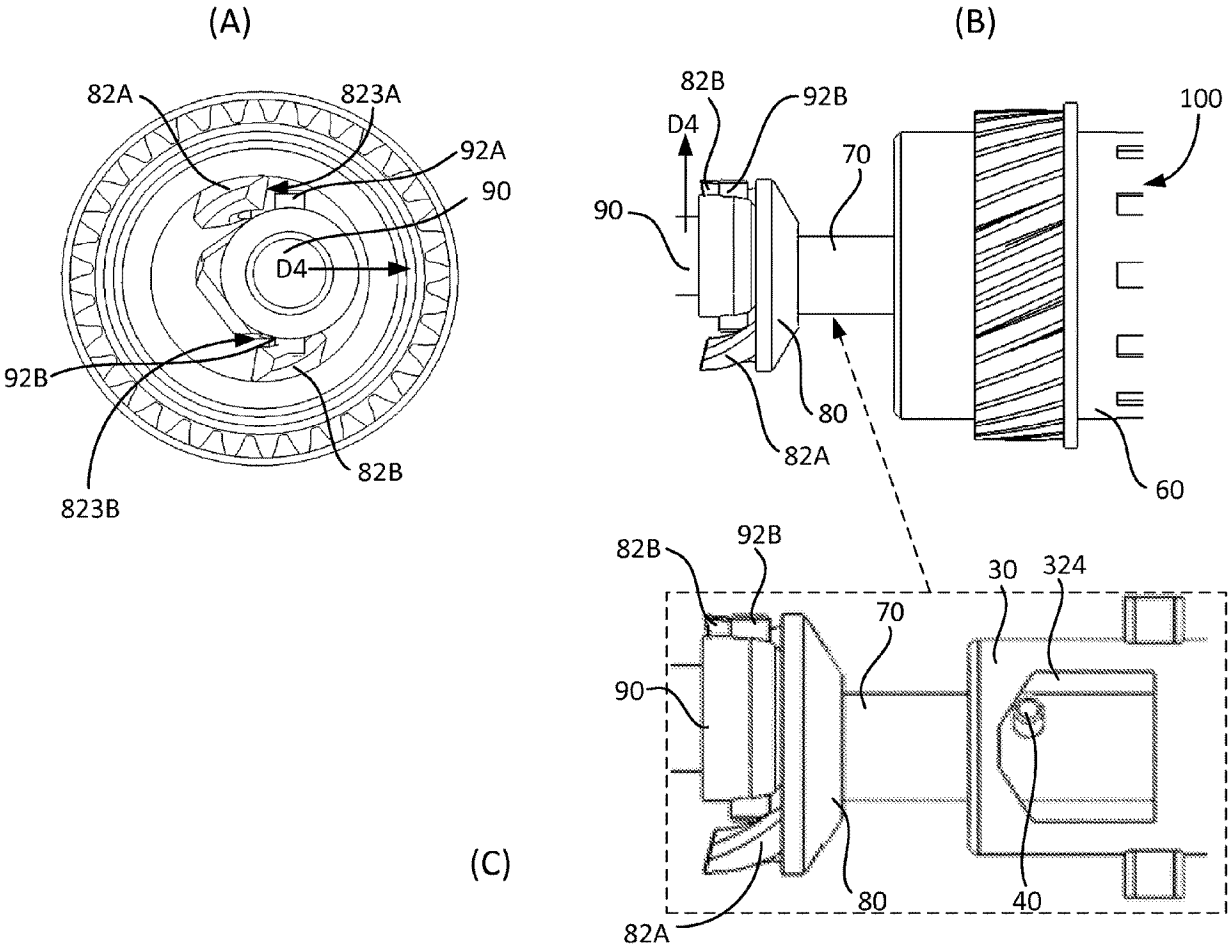
Figure 31:
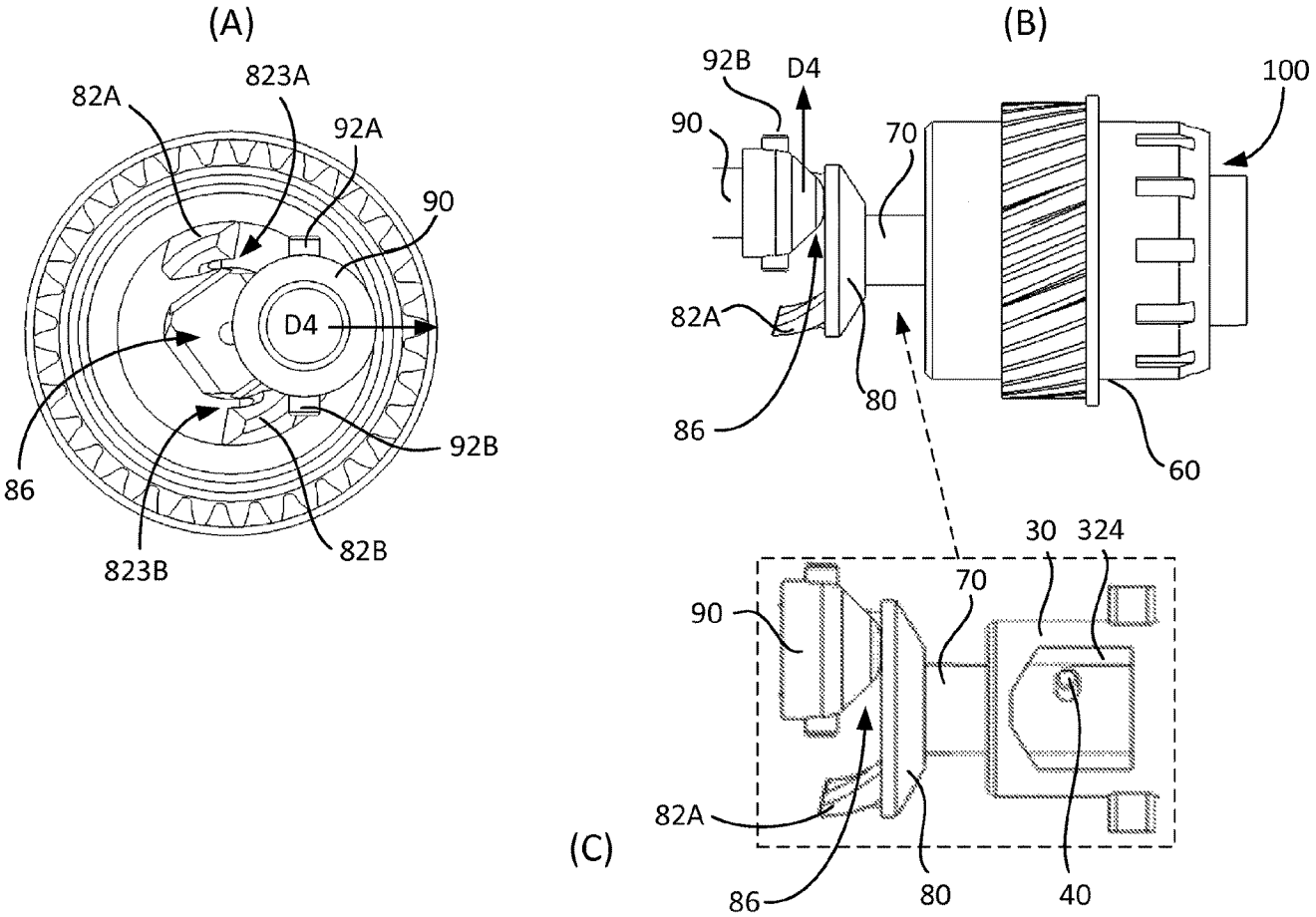
Figure 32:
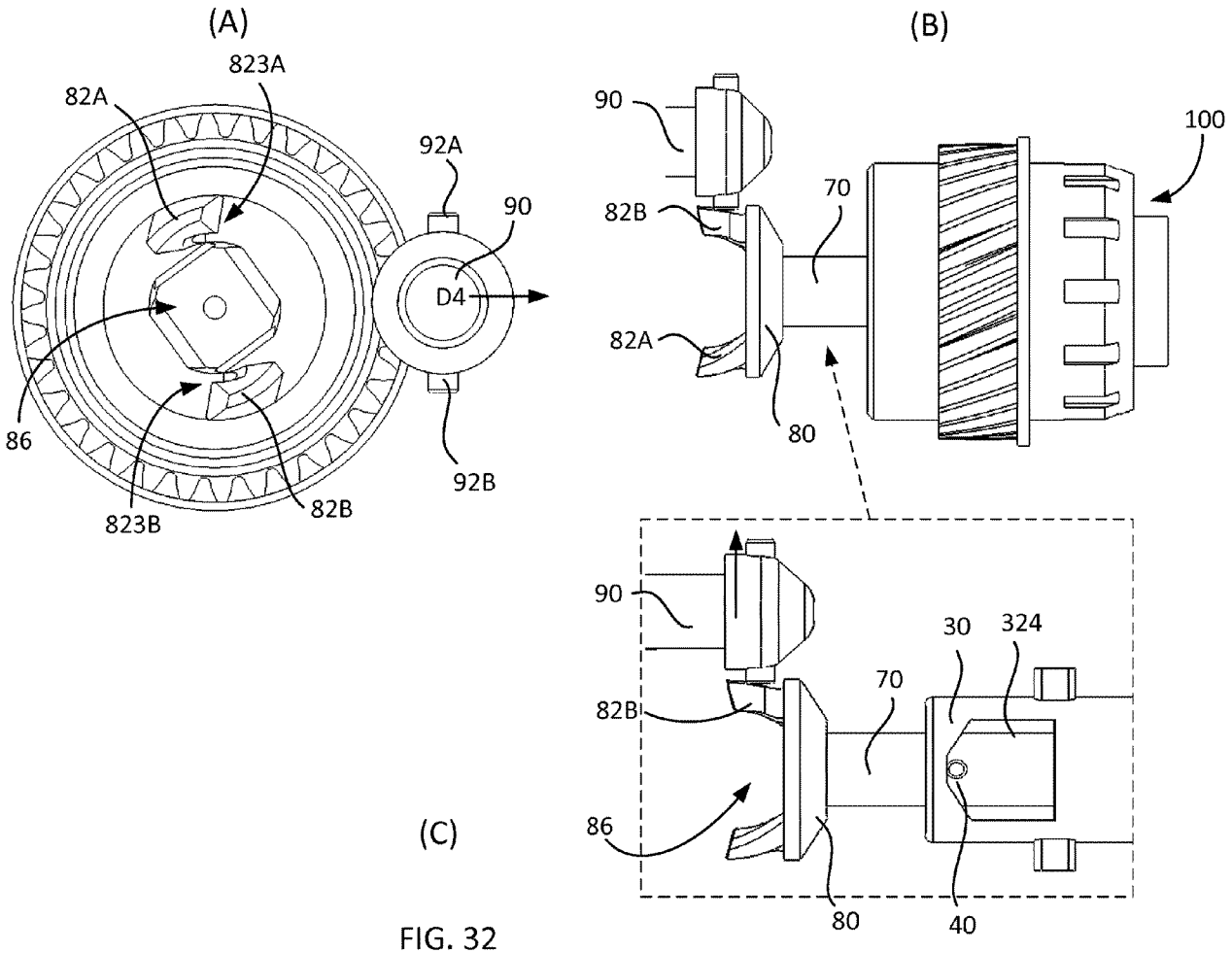
Figure 33:
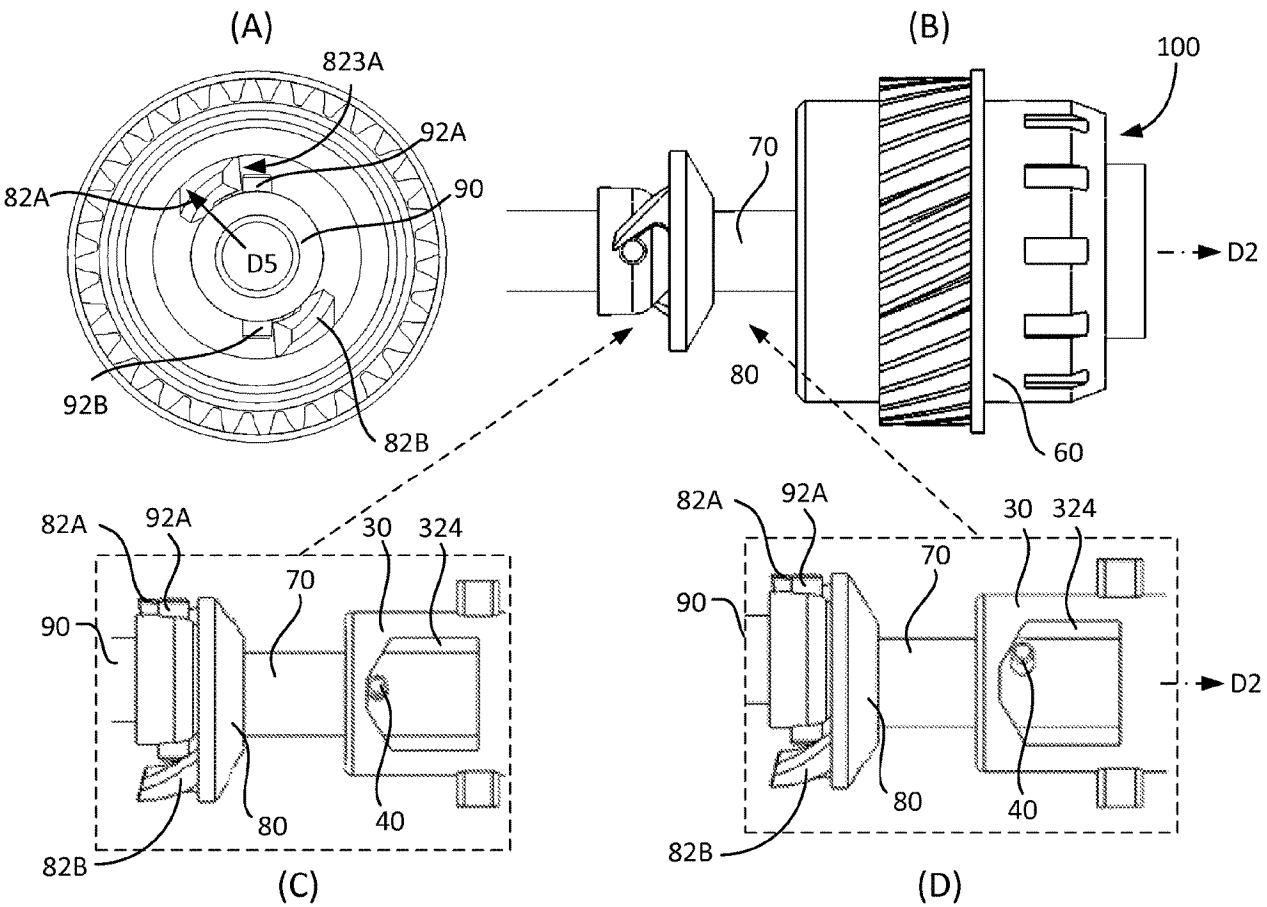
FIGS. 33-36 are views showing yet another process how the transmission device for a photosensitive drum according to the first embodiment of the present invention is separated from the drive member.
Figure 34:
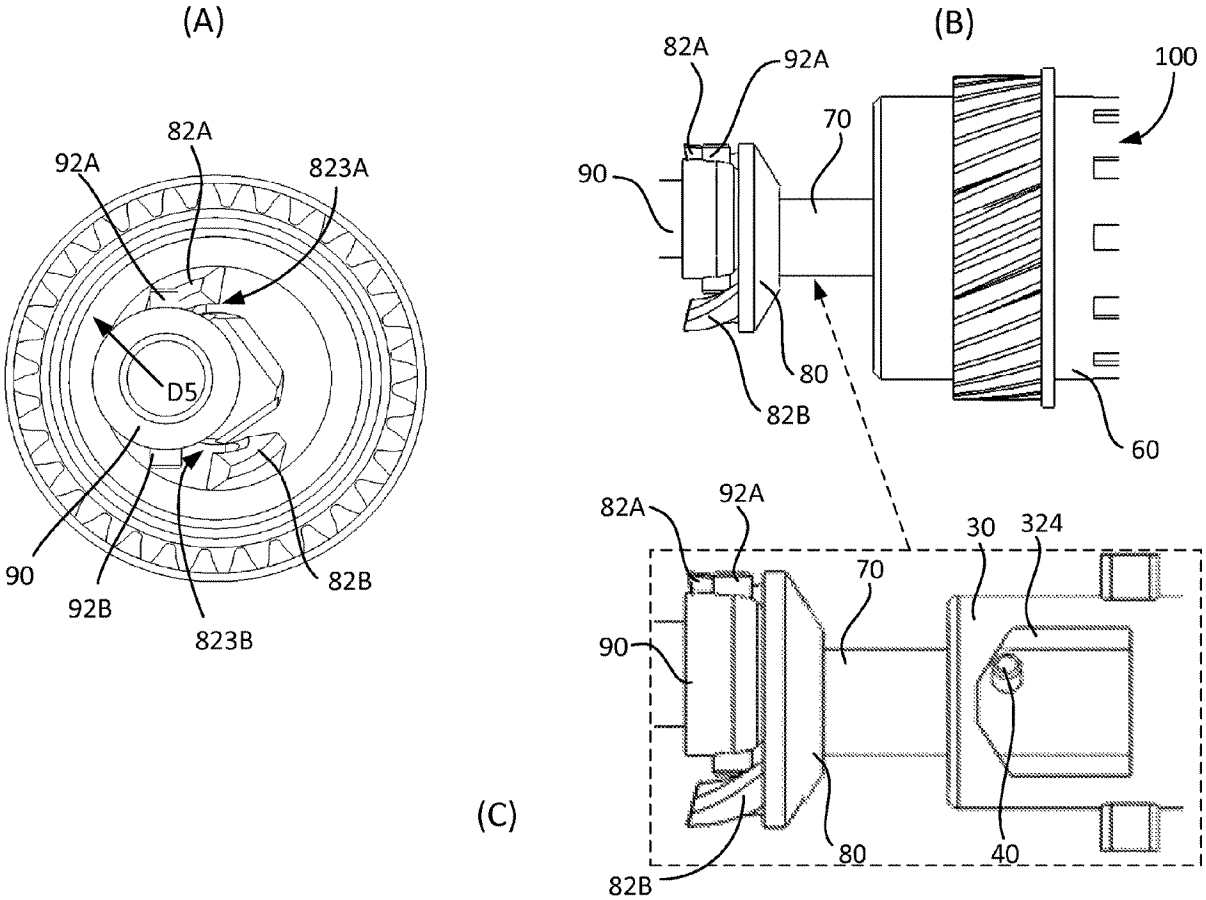
Figure 35:
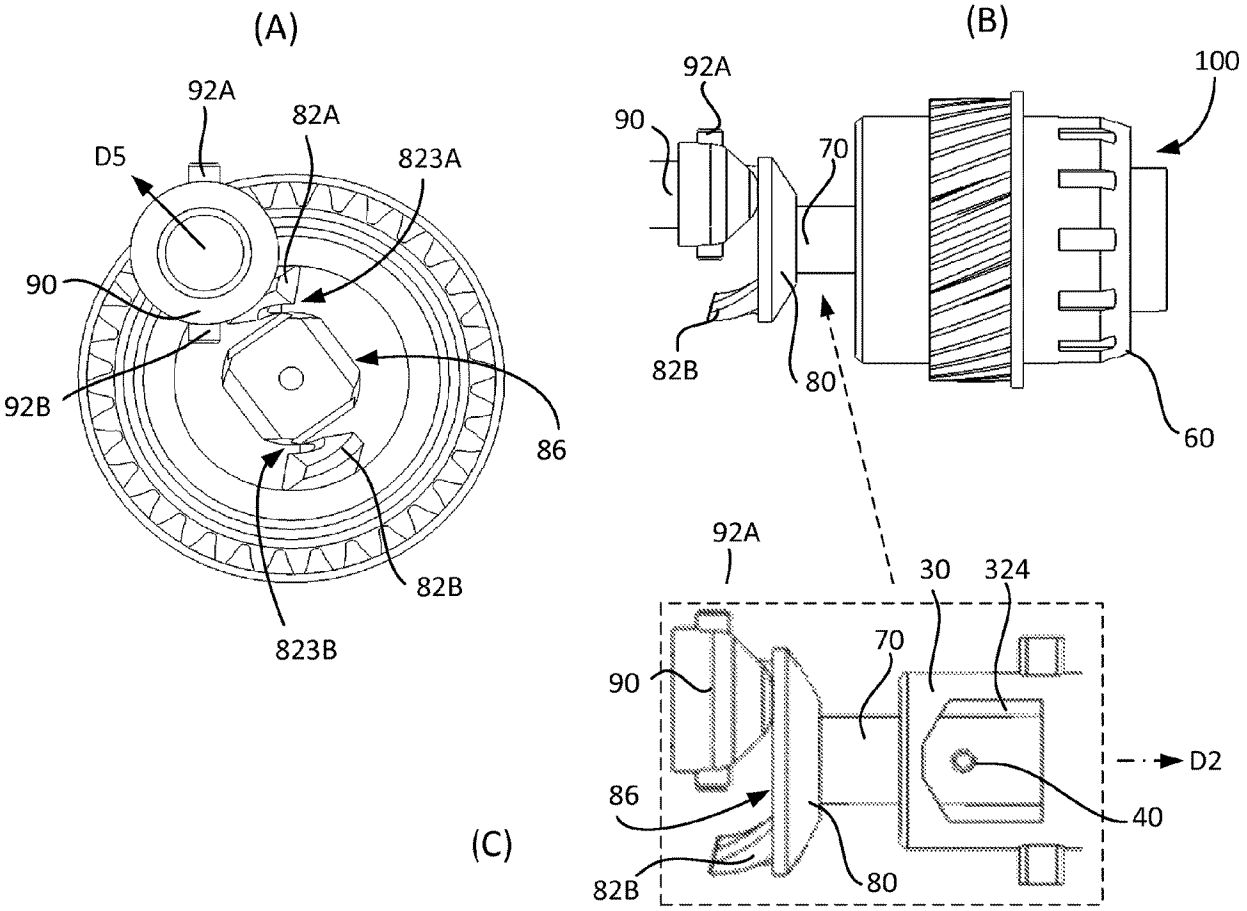
Figure 36:
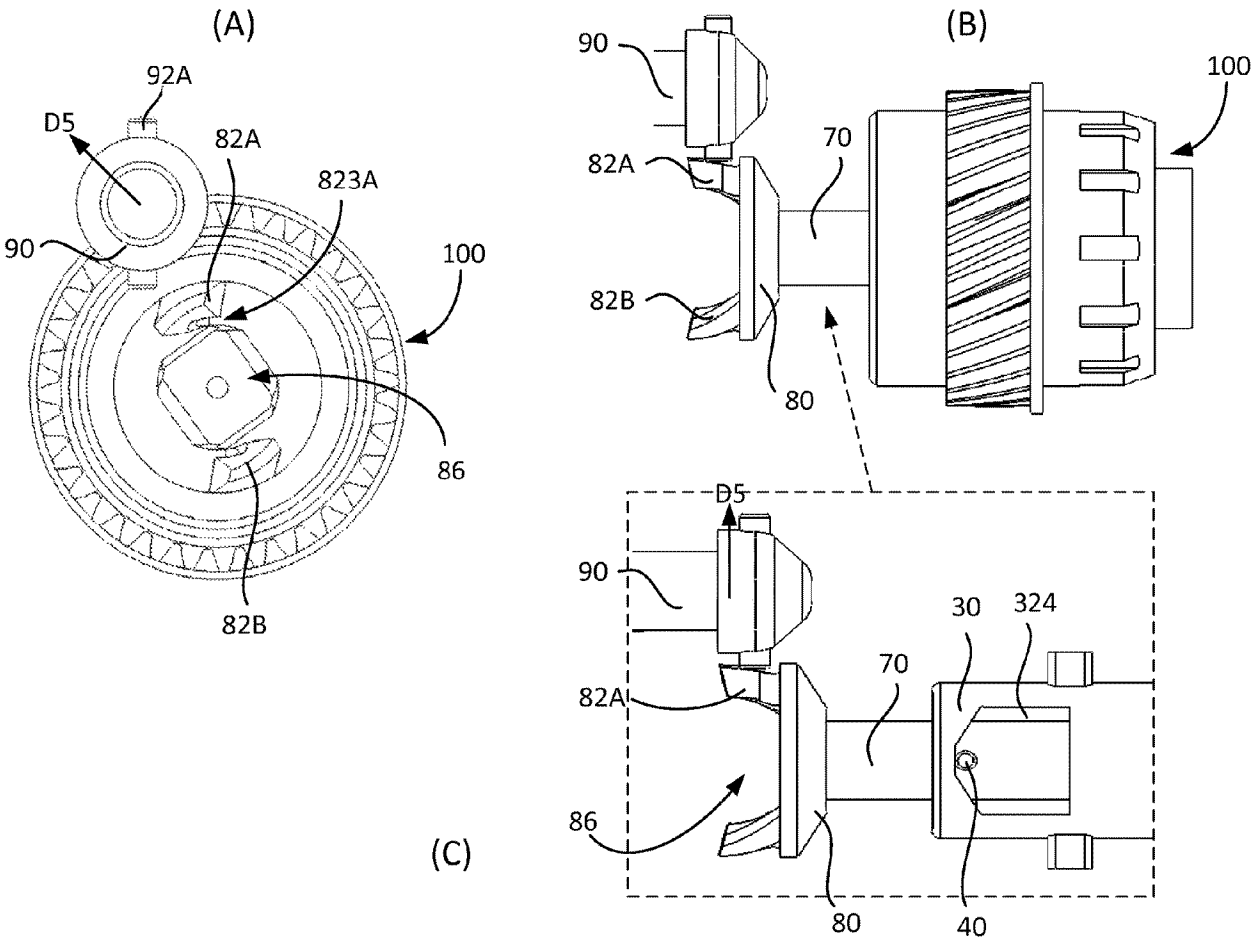

FIGS. 25-28 show a process how the transmission device 100 for a photosensitive drum according to the first embodiment of the present invention is separated from the drive member 90 by moving from the position shown in FIG. 25 toward the up direction, where the engagement blocks 82 are also denoted as a first engagement block 82A and a second engagement block 82B and the pillars 92 are also denoted as a first pillar 92A and a second pillar 92B, for the convenience of illustrating the separating process more clearly. At first, the second engagement block 82B is separated from the second pillar 92B directly, and the first engagement block 82A and the first pillar 92A push each other so that the transmission unit 20 in FIG. 25 rotates counterclockwise, as shown in FIGS. 26A-26D. At this time, because the drive member 90 is stationary, the rotating transmission unit 20 overcomes the elastic rebound force generated by the elastic member 50 and moves inwards along the axial hole 322 of the sleeve 30, i.e., toward the second direction D2, as shown in FIGS. 27A-27C, so that the first engagement block 82A is separated from the first pillar 92A. At this time, because the first engagement block 82A is still abutted against the body of the drive member 90, and the transmission device 100 continuously moves toward the up direction, the transmission unit 20 and the sleeve 30 overcome the elastic rebound force generated by the elastic member 50 to cause the first pillar 92A to pass over the vertex 821 of the first engagement block 82A and then separated from it, as shown in FIGS. 28A-28C. As a result, the transmission device 100 is separated from the drive member 90.

FIGS. 29-32 show another process how the transmission device 100 for a photosensitive drum according to the first embodiment of the present invention is separated from the drive member 90 by moving from the position shown in FIG. 25 toward the right direction, where the engagement blocks 82 are also denoted as a first engagement block 82A and a second engagement block 82B, and the pillars 92 is also denoted as a first pillar 92A and a second pillar 92B, for the convenience of illustrating the separating process more clearly. At first, the first engagement block 82A is separated from the pillars 92A directly, and the second engagement block 82B and the second pillar 92B push each other so that the transmission unit 20 in FIG. 25 rotates counterclockwise, as shown in FIGS. 29A-29D and 30A-30C. At this time, because the drive member 90 is stationary, the rotating transmission unit 20 overcomes the elastic rebound force generated by the elastic member 50 and moves inwards along the axial hole 322 of the sleeve 30, i.e., toward the second direction D2, as shown in FIGS. 31A-31C, so that the second engagement block 82B is separated from the second pillar 92B. At this time, because the second engagement block 82B is still abutted against the body of the drive member 90, and the transmission device 100 continuously moves toward the right direction, the transmission unit 20 and the sleeve 30 overcome the elastic rebound force generated by the elastic member 50 to cause the second pillar 92B to pass over the vertex 821 of the second engagement block 82B and then separated from it, as shown in FIGS. 32A-32C. As a result, the transmission device 100 is separated from the drive member 90.

FIGS. 33-36 show yet another process how the transmission device 100 for a photosensitive drum according to the first embodiment of the present invention is separated from the drive member 90 by moving from the position shown in FIG. 25 toward the up-left direction, where the engagement blocks 82 are also denoted as a first engagement block 82A and a second engagement block 82B and the pillars 92 are also denoted as a first pillar 92A and a second pillar 92B, for the convenience of illustrating the separating process more clearly. At first, the second engagement block 82B is separated from the second pillar 92B directly, and the first engagement block 82A and the first pillar 92A push each other so that the transmission unit 20 in FIG. 25 rotates counterclockwise, as shown in FIGS. 33A-33D. At this time, because the drive member 90 is stationary, the rotating transmission unit 20 overcomes the elastic rebound force generated by the elastic member 50 and moves inwards along the axial hole 322 of the sleeve 30, i.e., toward the second direction D2, as shown in FIGS. 34A-34C and 35A-35C, so that the first engagement block 82A is separated from the first pillar 92A. At this time, because the first engagement block 82A is still abutted against the body of the drive member 90, and the transmission device 100 continuously moves toward the up-left direction, the transmission unit 20 and the sleeve 30 overcome the elastic rebound force generated by the elastic member 50 to cause the first pillar 92A to pass over the vertex 821 of the first engagement block 82A and then separated from it, as shown in FIGS. 36A-36C. As a result, the transmission device 100 is separated from the drive member 90.

According to the present invention, the transmission device 100 for a photosensitive drum is simpler in structure than the conventional ones, and the way that the transmission device 100 is connected with and separated from the drive member 90 of an electronic image forming apparatus is different from the conventional ones. By the feature that the transmission unit 20 can move along the imaginary axis L and rotate about the imaginary axis L at the same time and the specially designed shape of the engagement blocks 82 of the transmission unit 20, no matter what angle the transmission device 100 is presented when entering or exiting the housing of the electronic imaging device, the transmission unit 20 will be connected with the drive member 90 firmly and separated from the drive member 90 smoothly.

The processes of how the transmission device 100 is connected with and separated from the drive member 90 are only possible ones of many conditions. For example, when the transmission device 100 is going to be connected with the drive member 90, the drive member 90 might first touch one of the engagement blocks 82 at its inner surface 824, or at its outer surface 825, as the condition illustrated before. In addition, the transmission device provided by the present invention can also be provided with the guiding block formed on the engagement block 82, the drive member 90 might touch the guiding bevel of one of the guiding blocks (not shown) at first; in that condition, the guiding bevel helps guiding the drive member 90 to enter the receiving space 86. However, the transmission device provided by the present invention can also be provided with more than two engagement blocks 82. Besides, the shape of the engagement concave 823 of each engagement block 82 is not limited to that provided in this embodiment, as long as the engagement concave 823 can be engaged with the pillar 92 of the drive member 90, and at the same time the pillar 92 can be hooked by a part of the engagement concave 823, e.g., the limiting surface 823b in the embodiment, to cause the transmission unit 20 unable to move toward the second direction D2 when the transmission unit 20 is driven to rotate.

Furthermore, the way that the sleeve 30 and the elastic member 50 are mounted in the gear member 60 is not limited to that provided in the embodiment. For example, the pillars 34 of the sleeve 30 and the limiting recesses of the gear member 60 can be replaced by recesses and protrusions, respectively. In another example, the bottom wall 65 of the gear member 60 can be mounted to the bottom potion 68 detachably so that the transmission unit 20 and the sleeve 30 coupled together and the elastic member 50 can be installed into the gear member 60 from its bottom; in this condition, the gear member 60 can be provided without the installation slot 62. The way that the sleeve 30 and the elastic member 50 are mounted in the gear member 60 also can be the design provided in the following embodiments.

Figure 6:
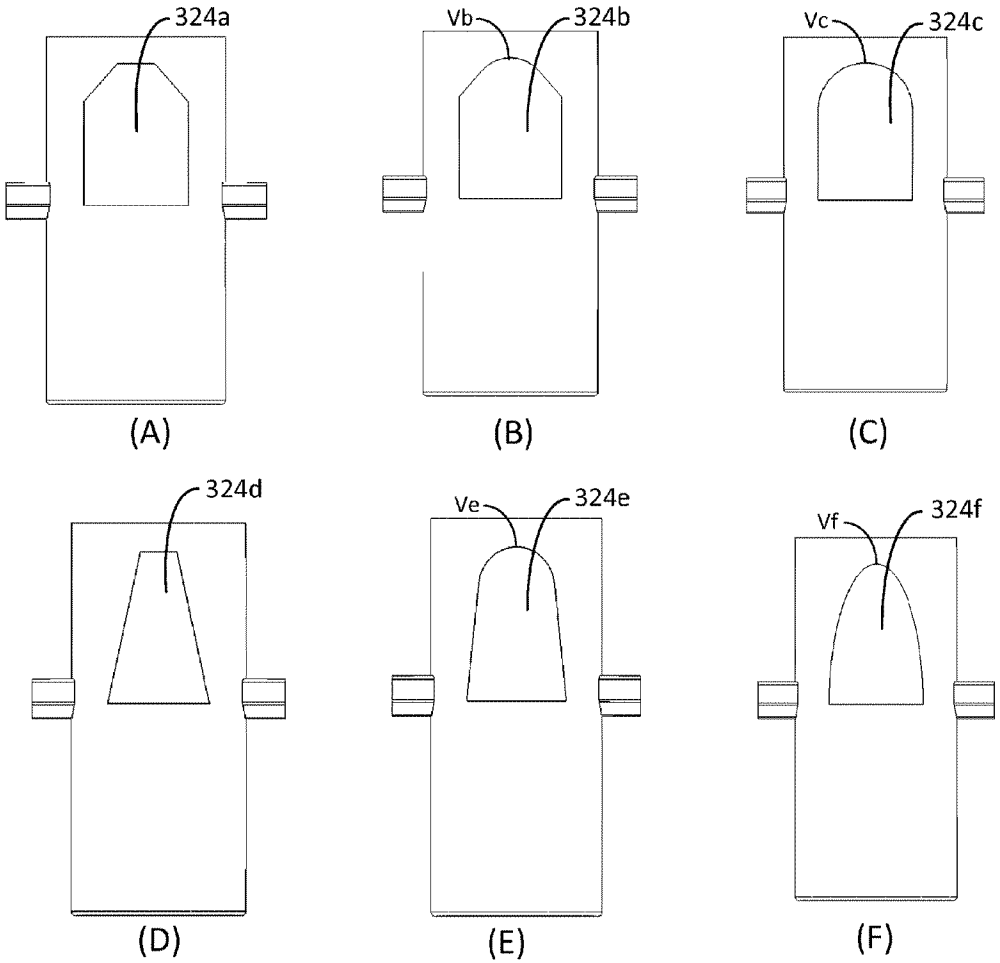
FIG. 6 shows cross-section views of different embodiments of sleeves (A)-(F), each usable in the transmission device for a photosensitive drum according to the first embodiment of the present invention.
Figure 8:
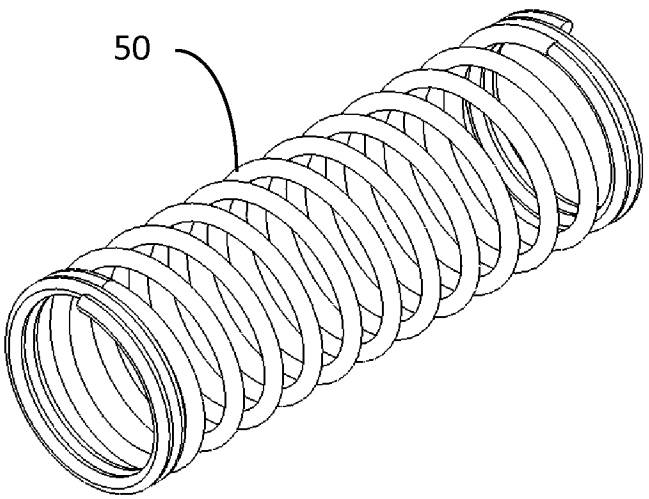
FIG. 8 shows an elastic member of the transmission device for a photosensitive drum according to the first embodiment of the present invention.
Figure 7:
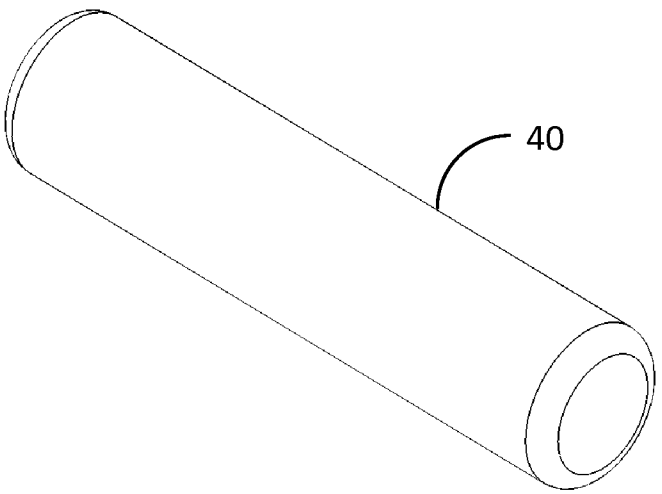
FIG. 7 shows a pin of the transmission device for a photosensitive drum according to the first embodiment of the present invention.
Figure 9:
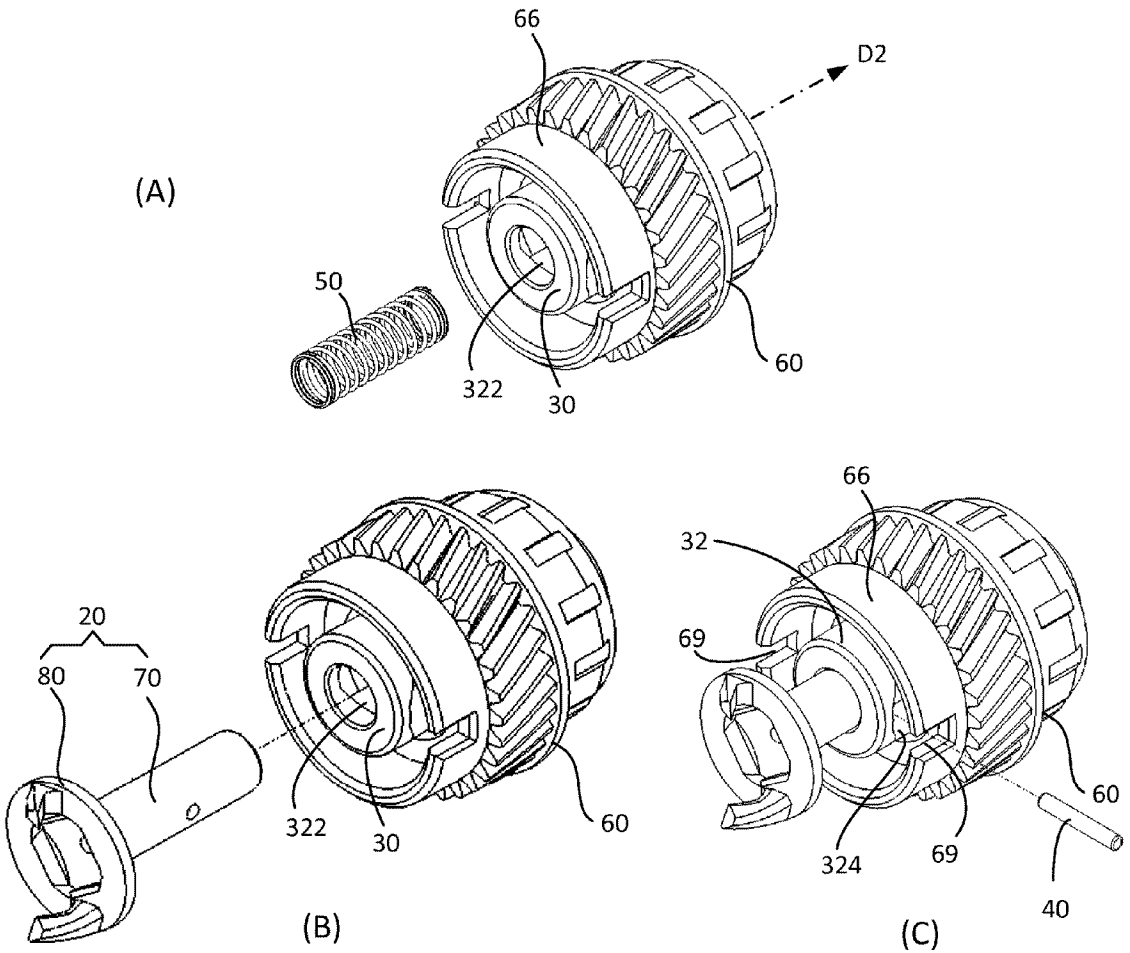
FIG. 9 shows the assembly process (A)-(C) of the transmission device for a photosensitive drum according to the first embodiment of the present invention.
Figure 10:
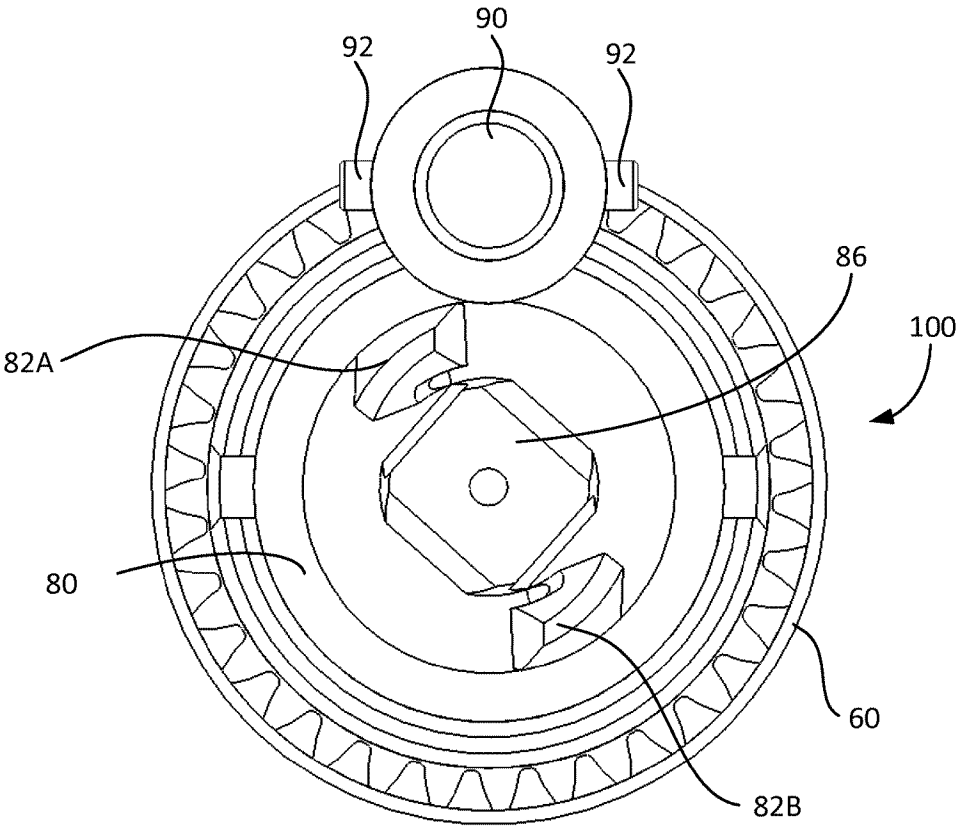
FIGS. 10-14 are views showing a process how the transmission device for a photosensitive drum according to the first embodiment of the present invention is connected with a drive member.
Figure 11:
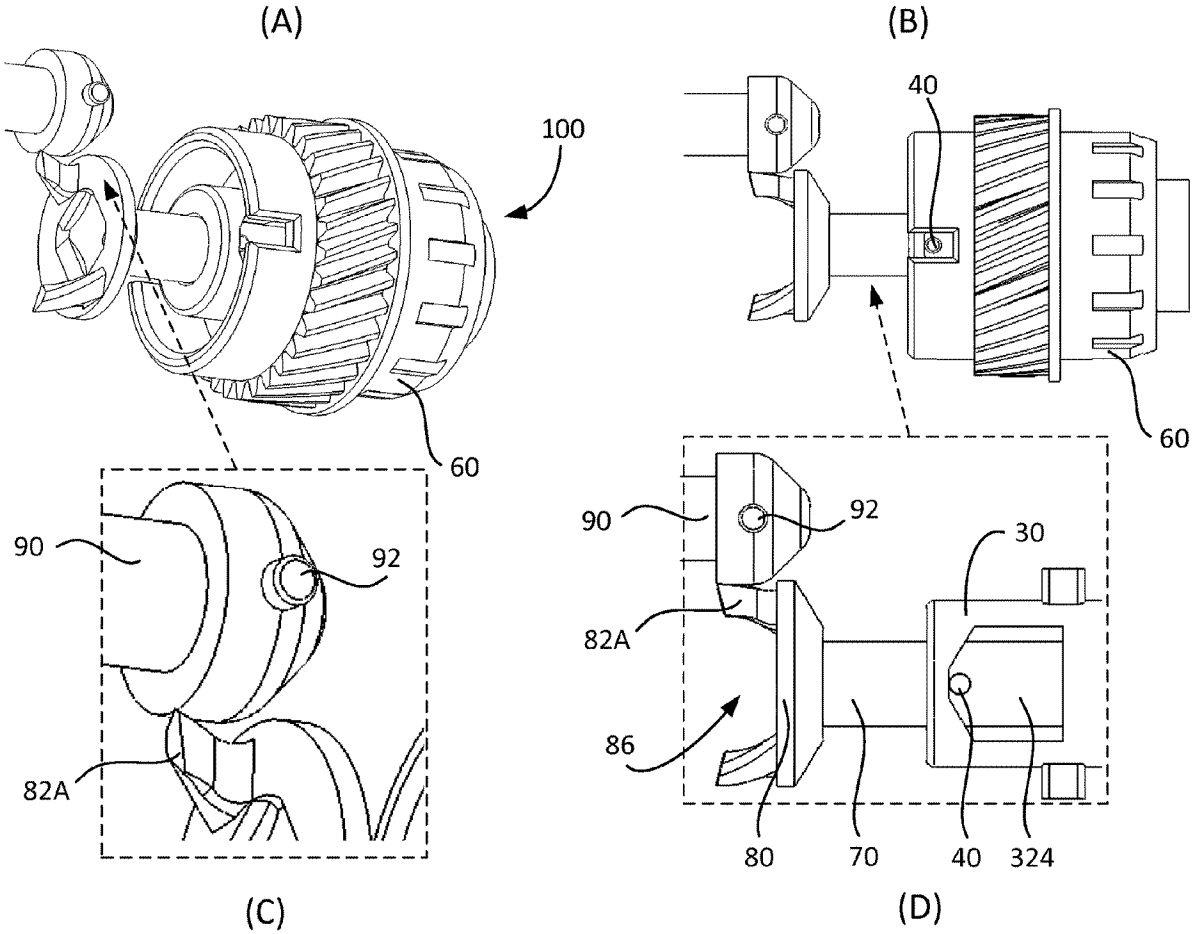
Figure 12:
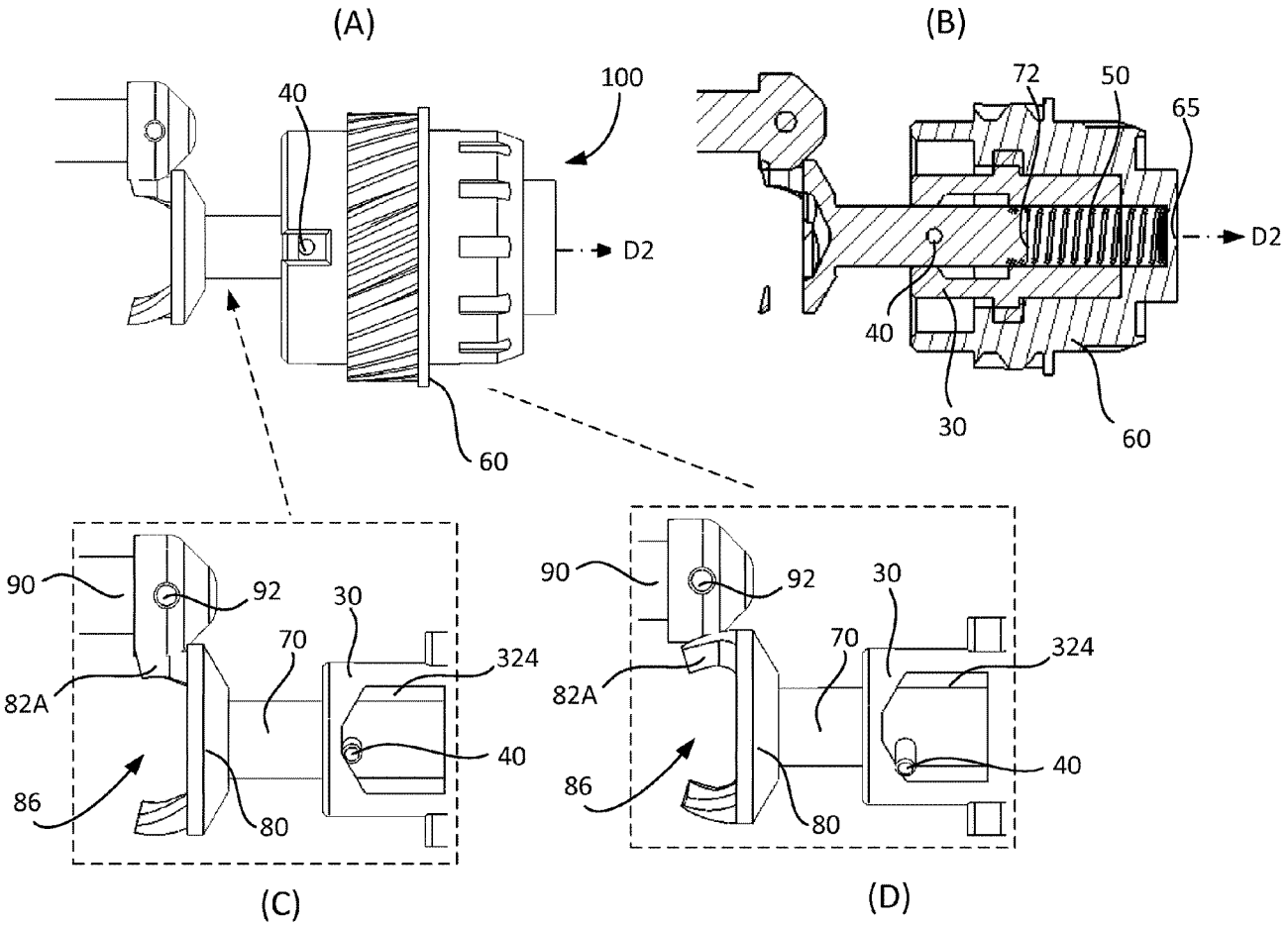
Figure 13:
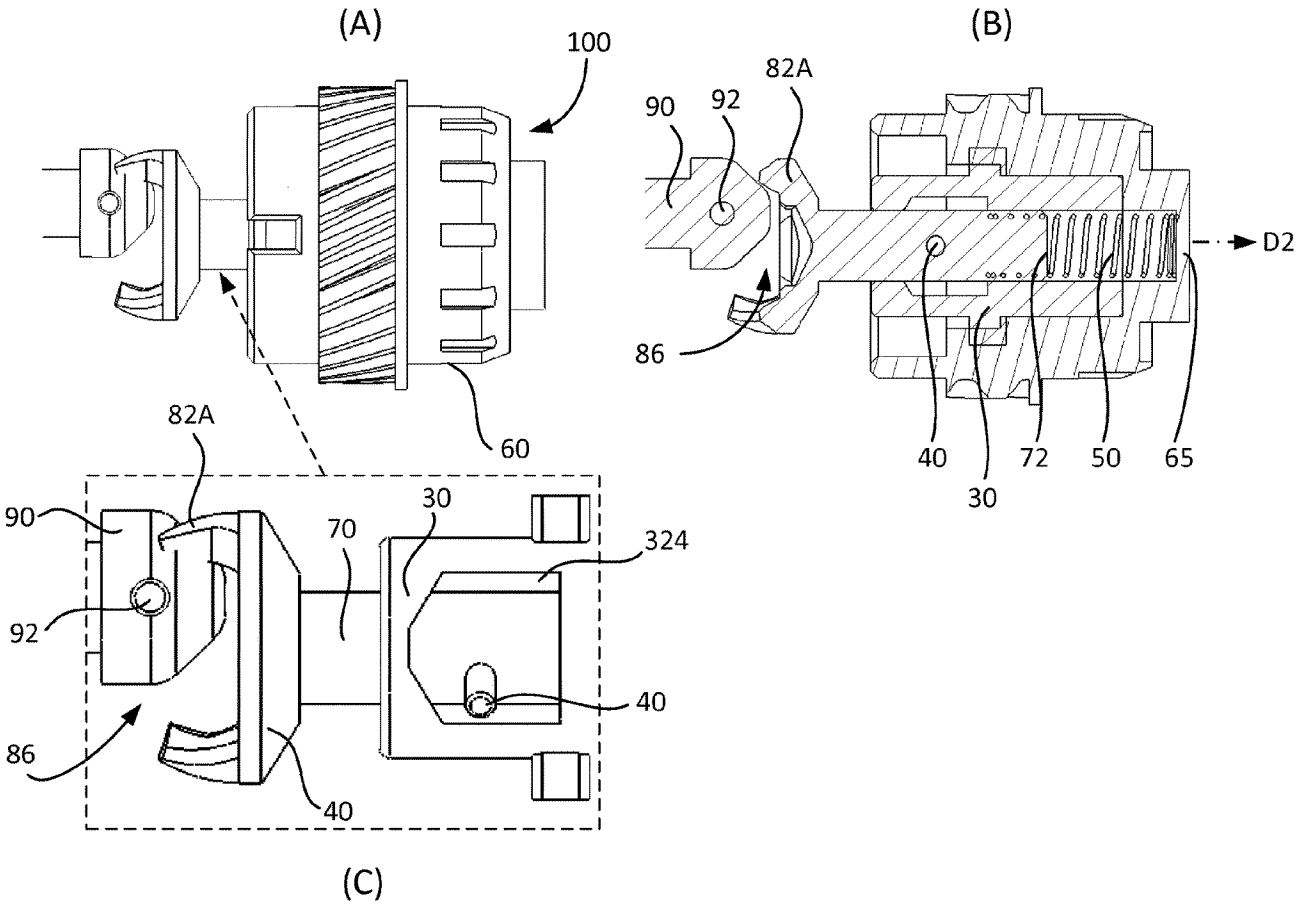
Figure 14:
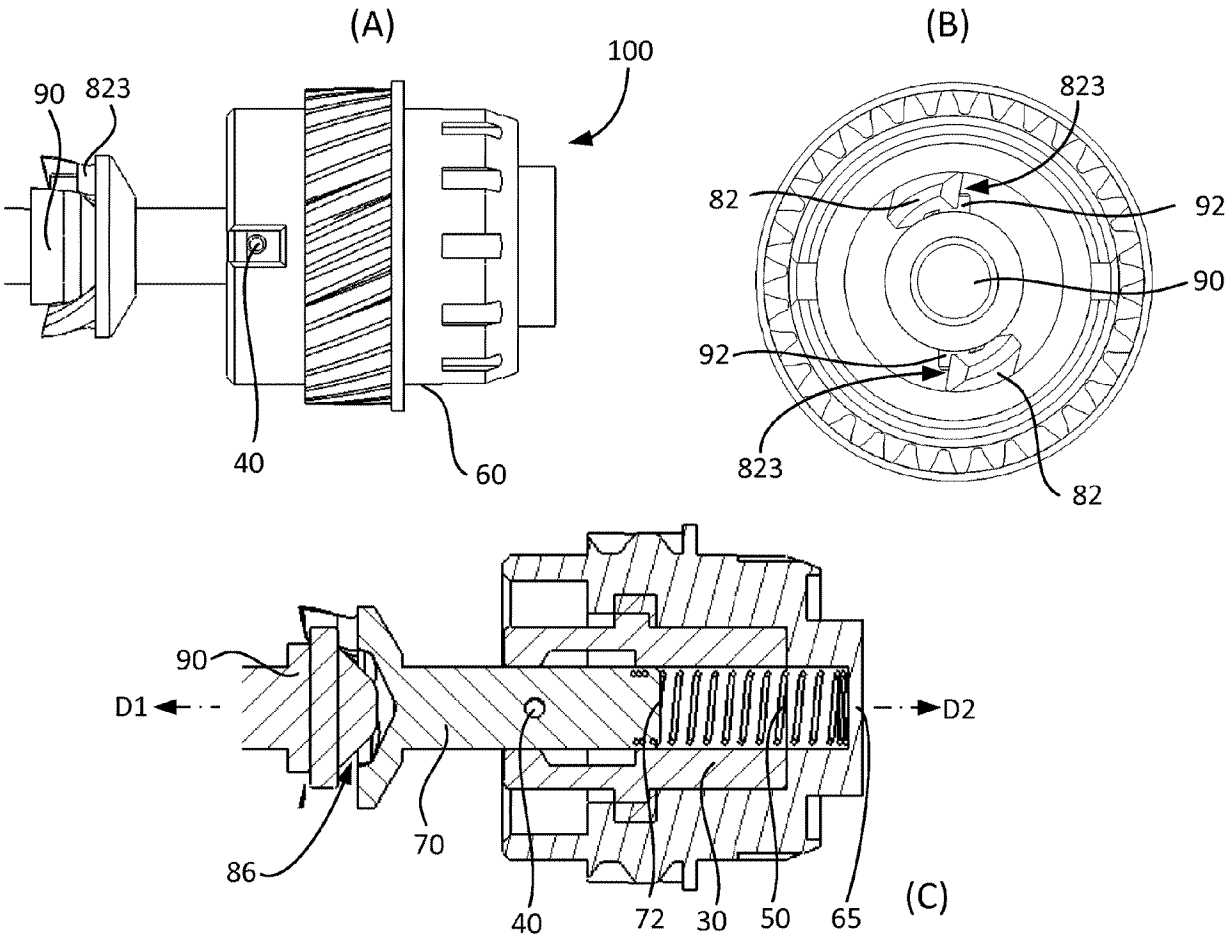
Figure 15:
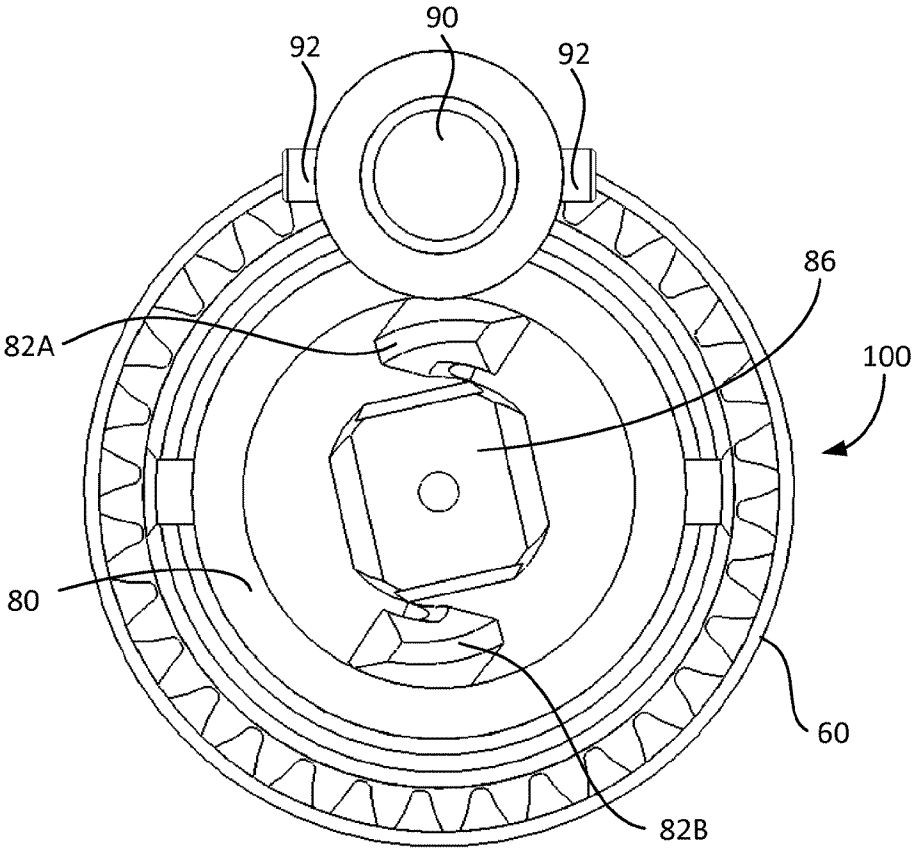
FIGS. 15-19 are views showing another process how the transmission device for a photosensitive drum according to the first embodiment of the present invention is connected with a drive member.
Figure 16:
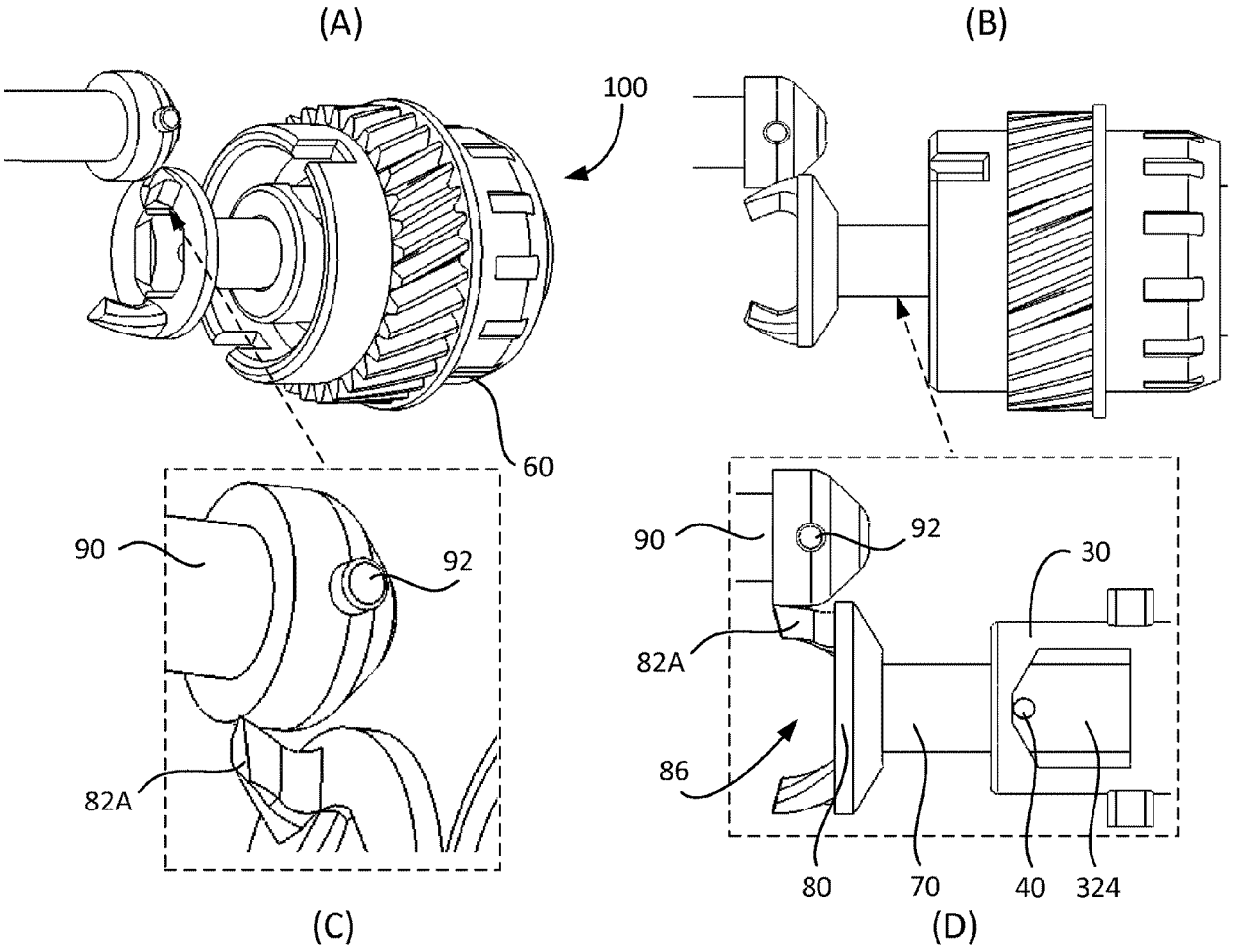
Figure 17:
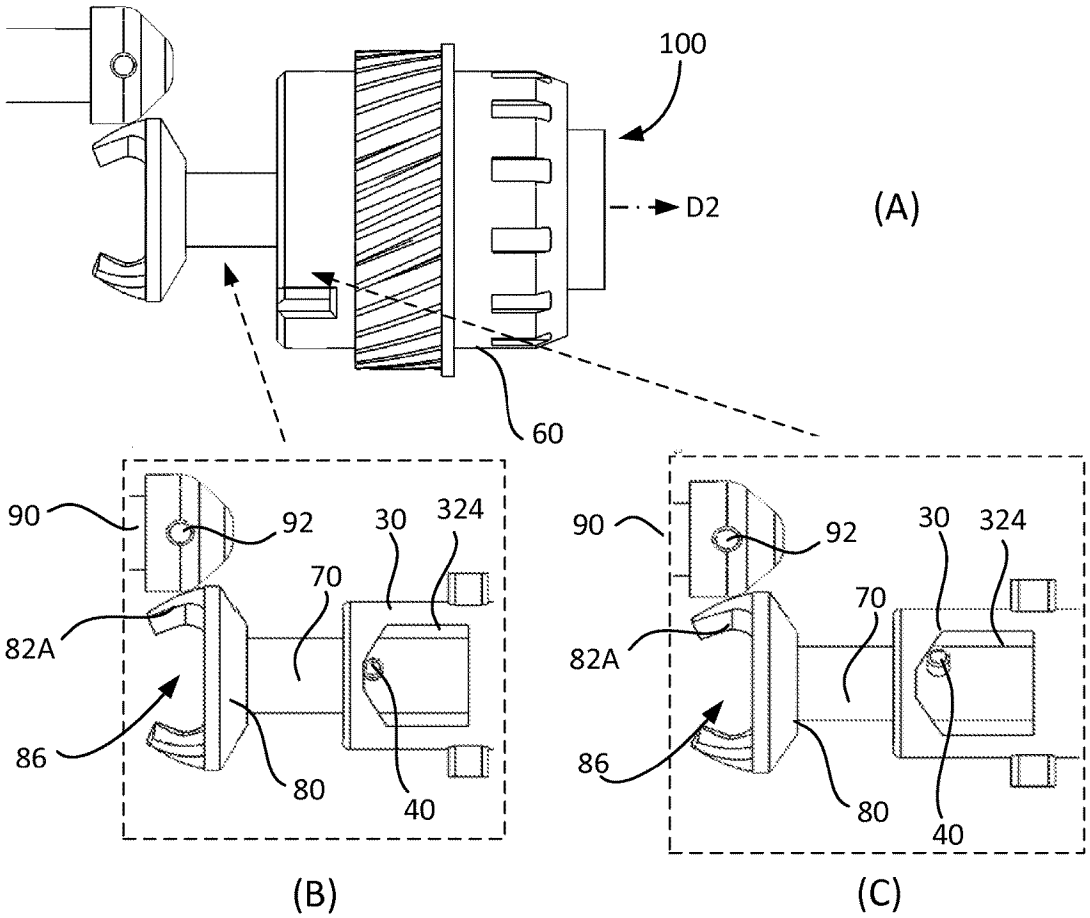
Figure 18:
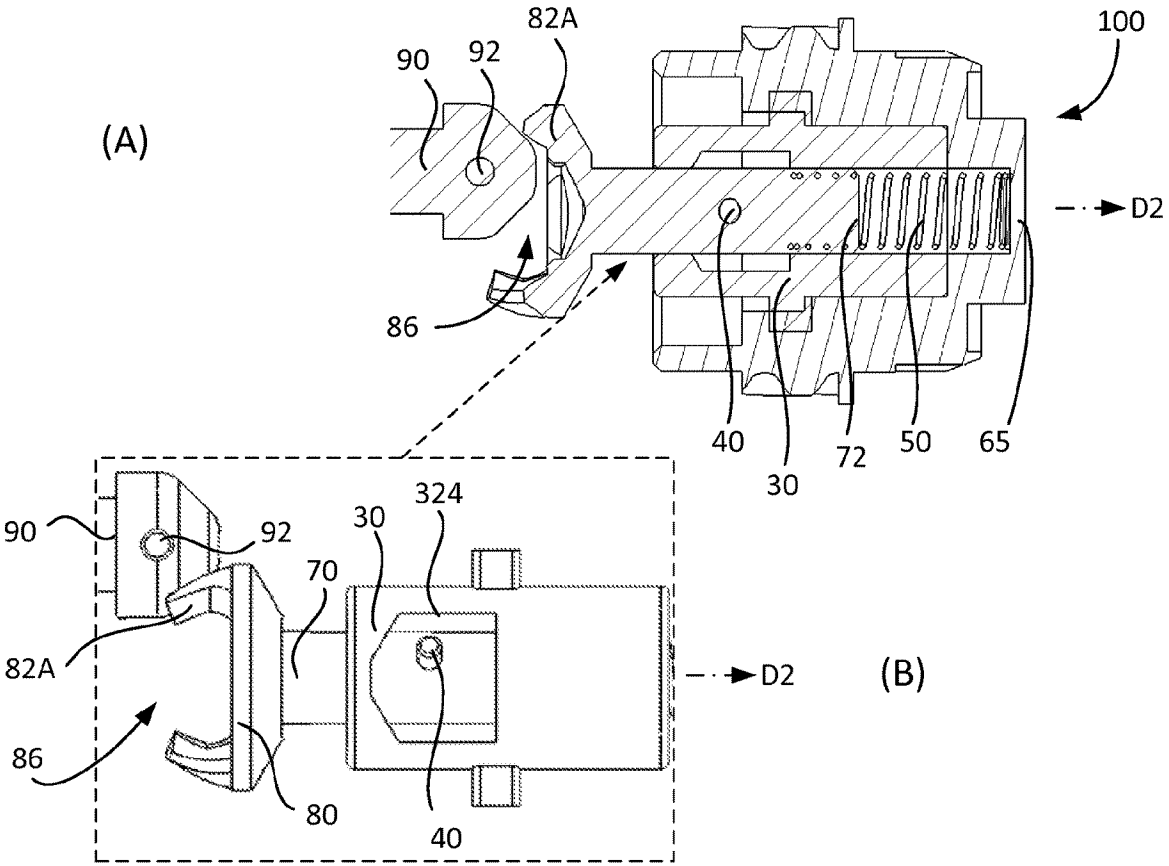
Figure 19:
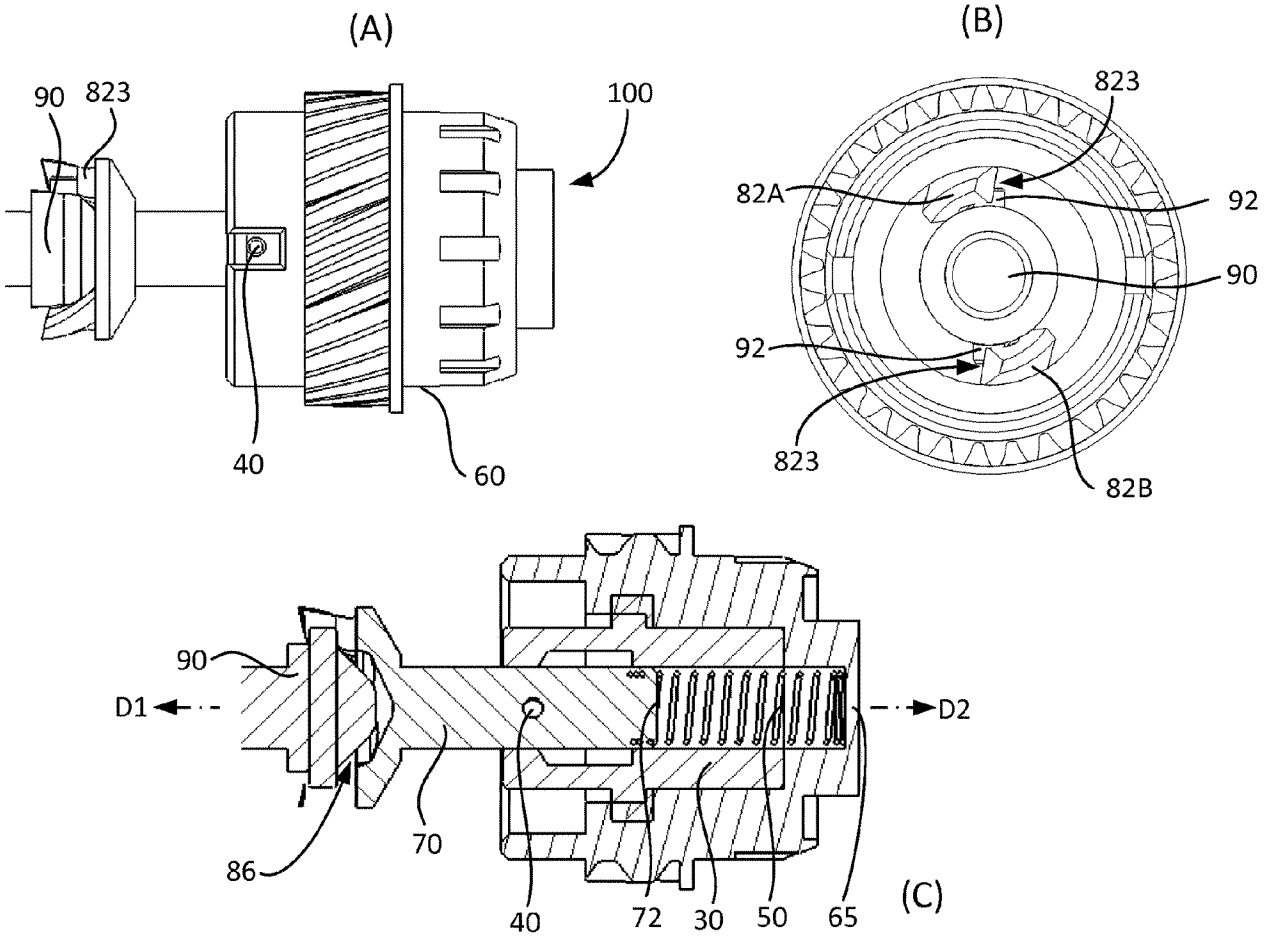
Figure 20:
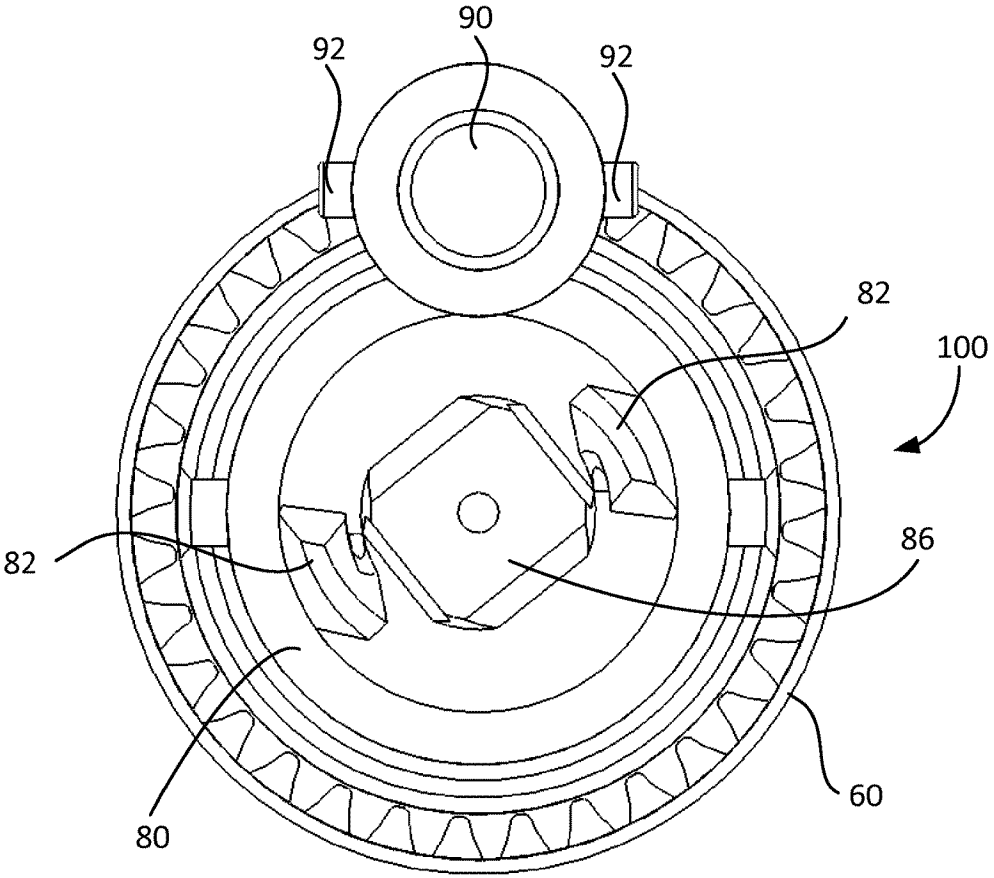
FIGS. 20-24 are views showing yet another process how the transmission device for a photosensitive drum according to the first embodiment of the present invention is connected with a drive member.
Figure 21:
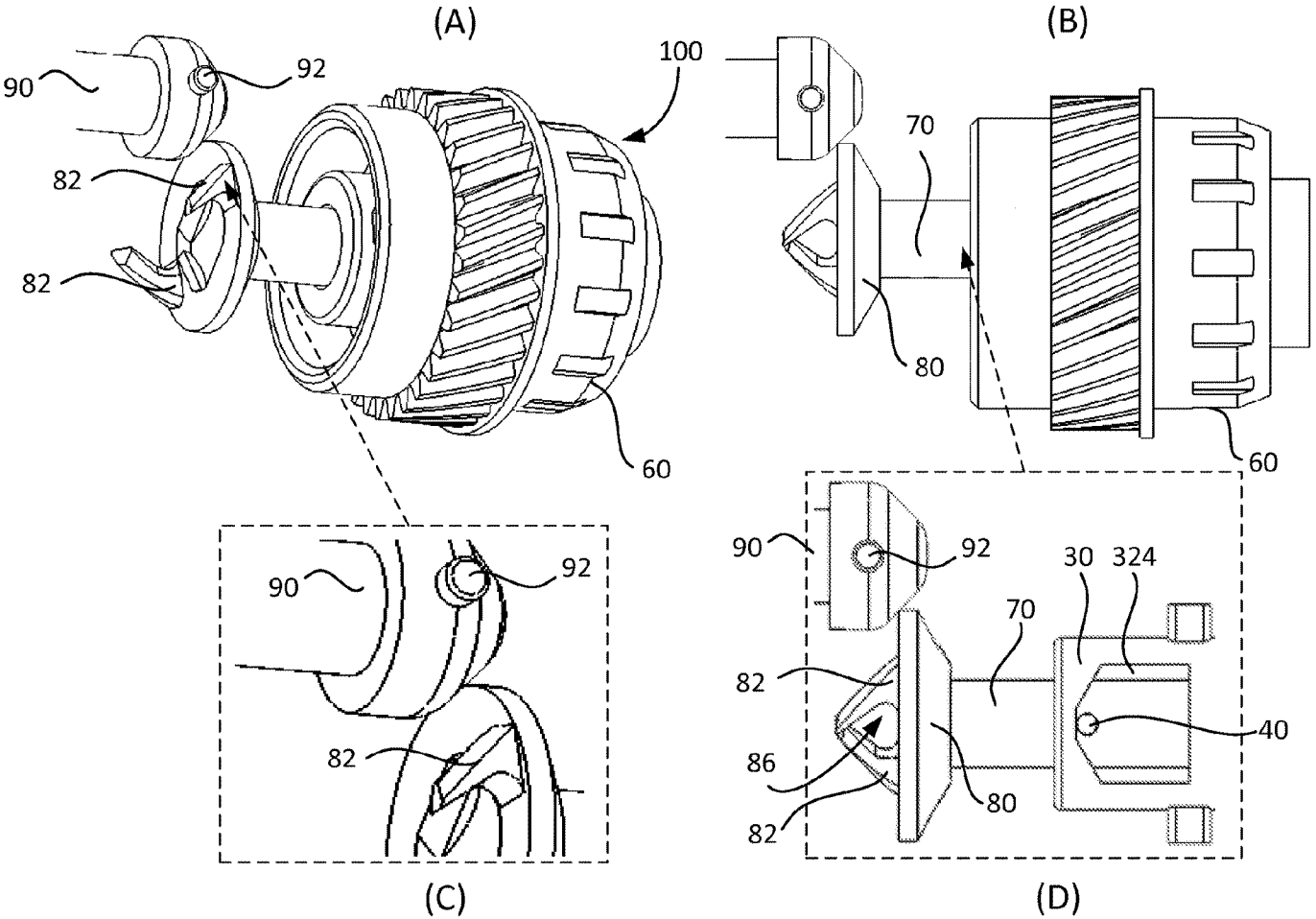
Figure 22:
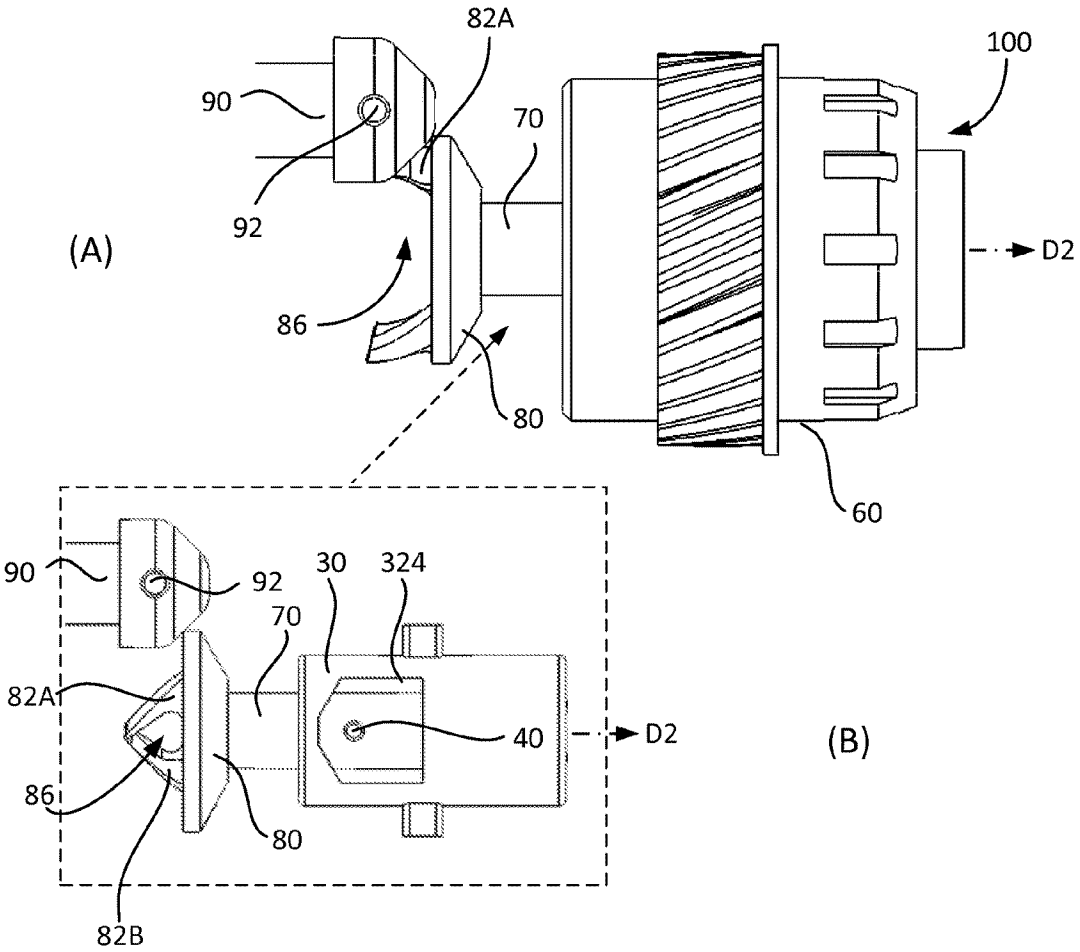
Figure 37:
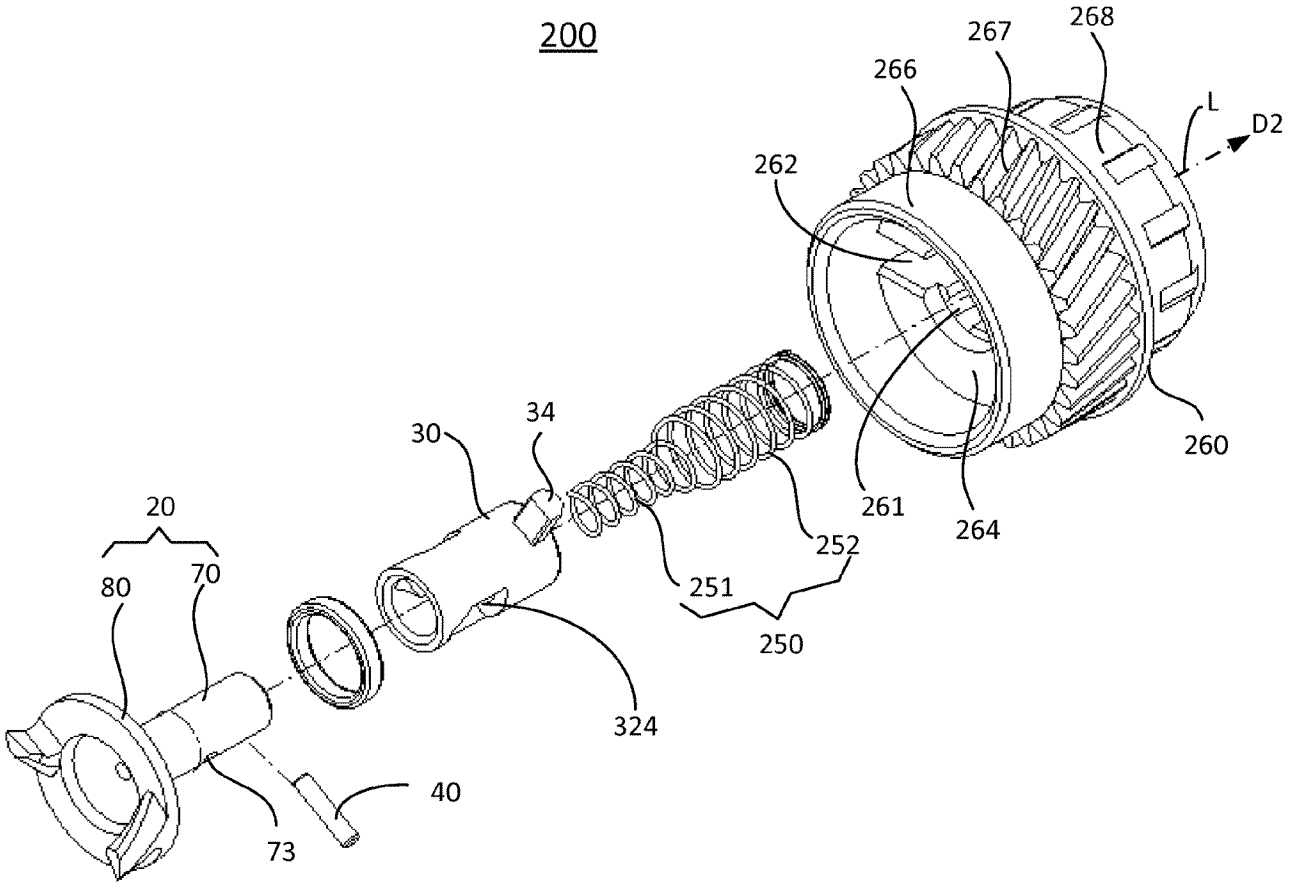
FIG. 37 shows an exploded perspective view of a transmission device for a photosensitive drum according to a second embodiment of the present invention.
Figure 38:
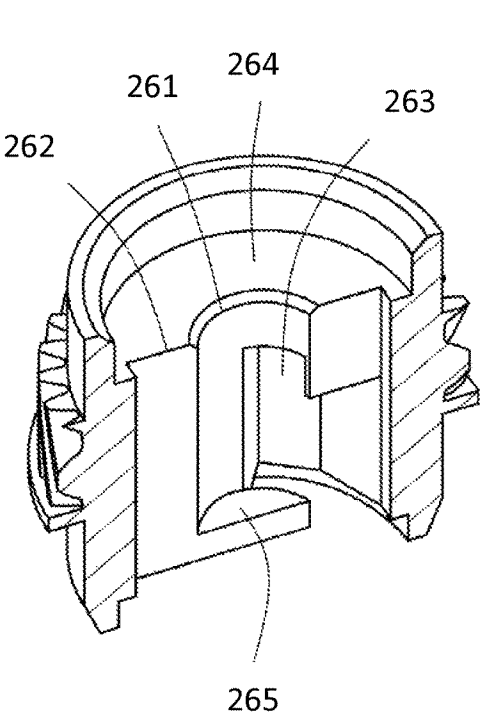
FIG. 38 shows (A) a front view and (B) a partially cut-away perspective view of a gear member of the transmission device for a photosensitive drum according to the second embodiment of the present invention.
Figure 38:
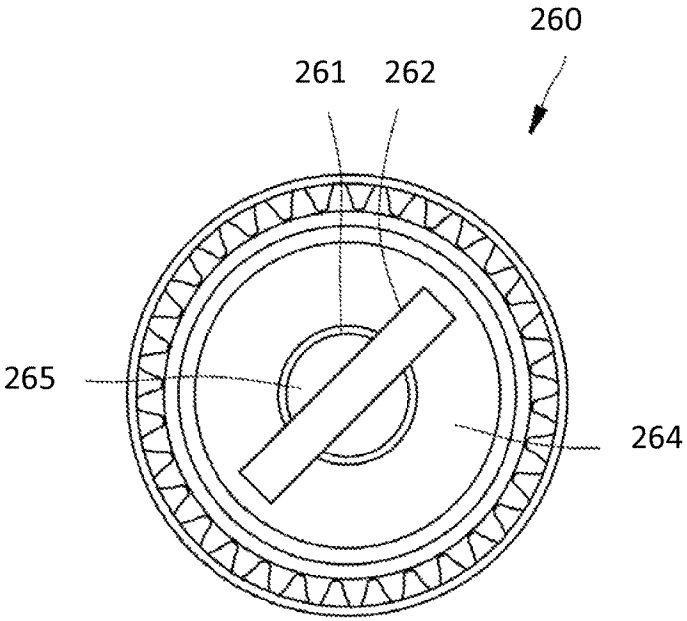

FIGS. 37 and 38 show a transmission device 200 for a photosensitive drum according to a second embodiment of the present invention. Similar to the transmission device 100, the transmission device 200 includes a transmission unit 20, a sleeve 30, an elastic member 250, and a gear member 260. The transmission unit 20 and the sleeve 30 are identical to that of the transmission device 100, as shown in FIGS. 3, 5 and 6. However, the gear member 260 is different from of the transmission device 100. In addition to the structure of the gear member 60, as shown in FIG. 4, i.e., the gear member 260 has a top portion 266, a gear portion 267 extending from the top portion 266 along the imaginary axis L toward the second direction D2, a bottom portion 268 extending from the gear portion 267 along the imaginary axis L toward the second direction D2, the gear member 260 also has two limiting recesses 263 that are communicated with the housing 261 for receiving the pillars 34 of the sleeve 30. Furthermore, the gear member 260 has an installation slot 262 that is communicated with the limiting recesses 263 and opened on the top wall 264, as shown in FIG. 38.

The elastic member 250 is also different from of the transmission device 100. In this exemplary embodiment, the elastic member 250 has a relatively larger radius section 251 and a relatively smaller radius section 252 extending from the relatively larger radius section. The relatively larger radius section 251 is disposed in the housing 261 of the gear member 260 and has two ends abutted against the bottom wall 265 of the gear member 260 and the sleeve 30, respectively. The relatively smaller radius section 252 is disposed in the axial hole 322 of the sleeve 30 and has an end abutted against the second end 72 of the shaft 70 of the transmission unit 20.

Figure 39:
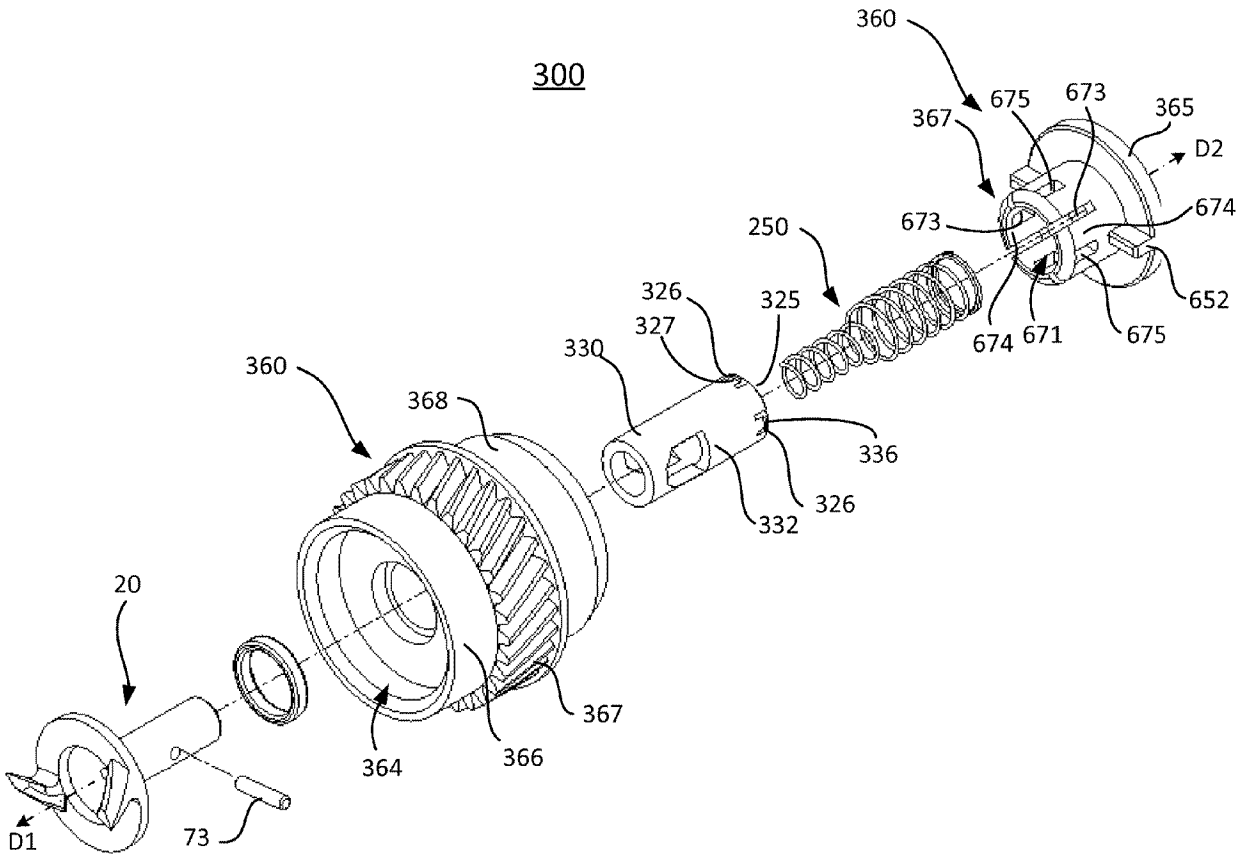
FIG. 39 shows an exploded perspective view of a transmission device for a photosensitive drum according to a third embodiment of the present invention.

FIG. 39 shows a transmission device 300 for a photosensitive drum according to a third embodiment of the present invention. Similar to the transmission devices 100, the transmission device 200 includes a transmission unit 20, a sleeve 330, an elastic member 250, and a gear member 360. The transmission unit 20 is identical to that of the transmission devices 100, as shown in FIG. 3. The elastic member 250 is the same as that of the transmission device 200, as shown in FIG. 37. The sleeve 330 and the gear member 360 are different from that of the transmission devices 100.

The main body 332 of the sleeve 330 has a bottom end 325 and a plurality of slots 326 concaved from the bottom end 325. There is an elastic block 327 formed between every two adjacent slots 326, and the sleeve 330 further has a plurality of convexities 336 protruding from some of the elastic blocks 327.

Figure 40:
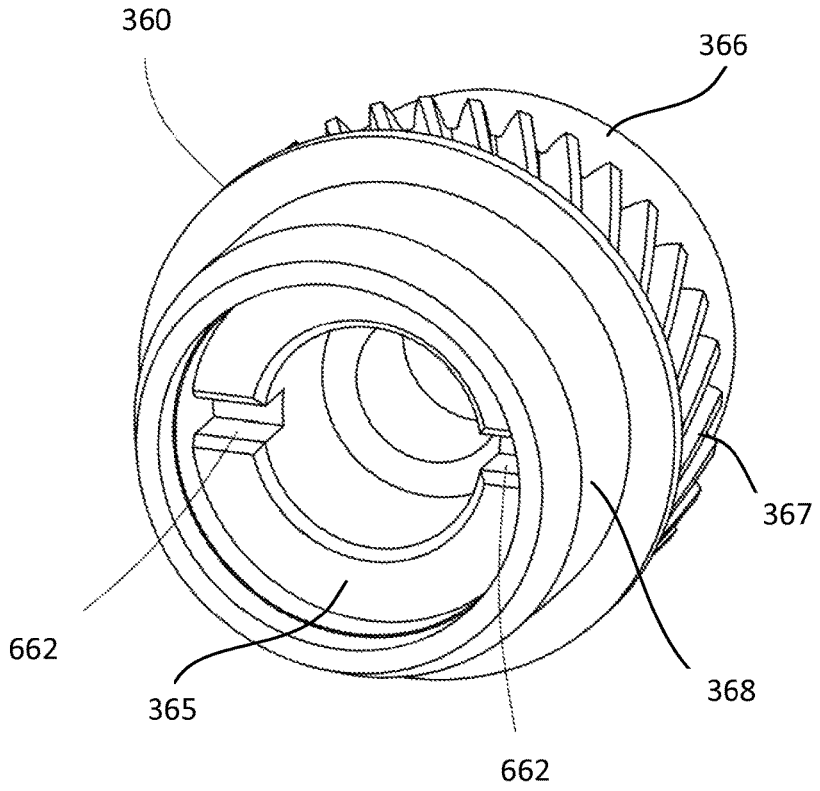
FIG. 40 shows a perspective view of a gear member of the transmission device for a photosensitive drum according to the third embodiment of the present invention.

The gear member 360 has a top portion 366, a gear portion 367 extending from the top portion 366 along the imaginary axis L toward the second direction D2, a bottom portion 368 extending from the gear portion 367 along the imaginary axis L toward the second direction D2, a top wall 364 located at the side of the top portion 366, and a bottom wall 365 located at the side of the bottom portion 368. The bottom wall 365 of the gear member 360 is detachably mounted to the bottom portion 368 of the gear member 360. The gear member 360 further has a coupling portion 367 protruding from the bottom wall 365 toward the top wall 364 of the gear member 360. The coupling portion 367 is annular member having a coupling concave 671 at the center. Besides, the coupling portion 367 has a top end 672 and a plurality of slots 673 concaved from the top end 672 toward the bottom wall 365. There is an elastic block 674 formed between every two adjacent slots 673, and there is a through groove 675 located at each elastic block 674 and extending along the imaginary axis L. In this embodiment, the bottom portion 368 of the gear member 360 has two fitting slots 662, as shown in FIG. 40, and the bottom wall 365 of the gear member 360 has two fitting blocks 652 inlaid in the fitting slots 662 respectively to make the bottom wall 365 unrotatable relative to the bottom portion 368 of the gear member 360. The amounts of the fitting slots 662 and the fitting blocks 652 are unlimited as long as their amounts are the same. The bottom wall 365 can also be connected with the bottom portion 368 of the gear member 360 integrally; however, the design that the bottom wall 365 is separable from the bottom portion 368 of the gear member 360 as in this embodiment is more convenient in assembly. In addition, the design that the bottom portion has the fitting blocks and the bottom wall has the fitting slots also can achieve the aforesaid effect.

By the elasticity of the elastic blocks 327 and 674, the sleeve 330 is mounted in the coupling concave 671, and the convexities 336 are inserted into the through grooves 675 and movable along the through grooves 675 so that the sleeve 330 is unrotatable relative to the gear member 360.

Figure 41:
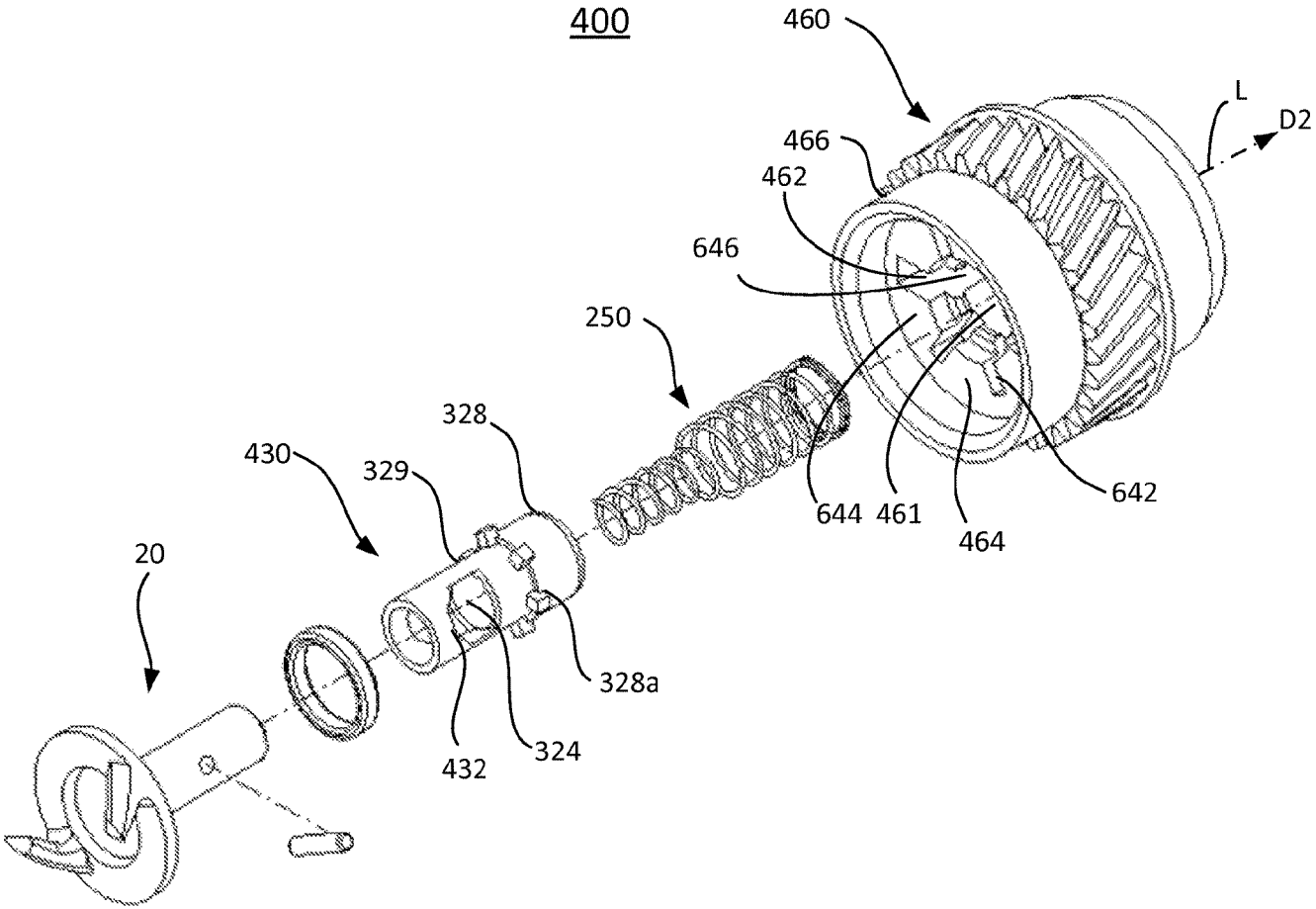
FIG. 41 shows an exploded perspective view of a transmission device for a photosensitive drum according to a fourth embodiment of the present invention.

Referring to FIG. 41, a transmission device 400 for a photosensitive drum is shown according to a fourth embodiment of the present invention. The transmission device 400 includes a sleeve 430 and a gear member 460 that are different from those in the aforesaid embodiments.

The main body 432 of the sleeve 430 has a relatively larger radius section 328 and a relatively smaller radius section 329 connected with the relatively larger radius section 328. The relatively larger radius section 328 is provided with a plurality of protrusions 328a protruded from the outer surfaces of the relatively larger radius section 328. The guiding grooves 324 are located at the relatively smaller radius section 329. The top wall 464 of the gear member 460 has a plurality of slots 642 communicated with the receiving hole (i.e., housing) 461. There is an elastic block 644 formed between every two adjacent slots 642, and each elastic block 644 has a stair 646. There are further a plurality of limiting grooves (not shown) formed in the wall of the receiving hole 461. The plurality of protrusions 328a in the relatively larger radius section 328 is corresponding to the plurality of limiting grooves in the wall of the receiving hole 461. The amounts of the protrusions 328a and the limiting grooves 468 are unlimited as long as their amounts are the same. By the elasticity of the elastic blocks 644, the relatively larger radius section 328 of the sleeve 430 is inserted into the receiving hole 461 and limited in the receiving hole 461 by the stairs 646, and the protrusions 328a are disposed in the limiting grooves, respectively. As a result, the sleeve 430 is unrotatable relative to the gear member 460. In addition, this exemplary embodiment is very simple in structure. The stairs 646 also can be the bottom edges of the elastic blocks 644 which are not stair-shaped.

In addition, the way that the sleeve 430 is mounted in the gear member 60 is not limited to that provided in the embodiment. For example, the relatively larger radius section 328 of the sleeve 430 is provided with a limiting groove, the wall of the housing 461 is provided with a limiting block protruded in the housing 461. As assembled, the relatively larger radius section 328 of the sleeve 430 is limited in the housing 461 by the stairs 646, and the limiting block is disposed in the limiting groove 328a. Accordingly, the sleeve 430 is unrotatable relative to the gear member 460.

In one embodiment, the transmission device includes a shaft having a first end, an opposing second end, and at least one protrusion extending along a radial direction of the shaft; an engagement portion having a base extending from the first end of the shaft, at least one engagement block helically extending from a side of the base toward a first direction, and a receiving space formed therein; a sleeve having a main body, an axial hole defined through the main body along an axis, and at least one guiding groove formed on the main body and communicated with the axial hole, wherein when the shaft is disposed in the axial hole, the shaft is rotatable and movable axially, and the at least one protrusion of the shaft is movably retained in the at least one guiding groove; a gear member for engaging with the photosensitive drum, having a housing formed for receiving the main body of the sleeve axially such that the sleeve is coupled with the gear member unrotatably around the axial axis; and an elastic member being disposed in the axial hole of the sleeve and having two ends abutted against a bottom wall of the gear member and the second end of the shaft, respectively.

In another embodiment, the transmission device includes a gear member for engaging with the photosensitive drum, having a housing and a sleeve disposed in the housing, wherein the sleeve has a main body, an axial hole defined through the main body along an axis, and at least one guiding groove formed on the main body and communicated with the axial hole, and is coupled with the gear member unrotatably around the axis; an elastic member being disposed in the axial hole of the sleeve; and a transmission unit comprising a shaft having a first end, an opposing second end, and at least one protrusion extending along a radial direction of the shaft; and an engagement structure having a base extending from the first end of the shaft, at least one engagement block helically extending from a side of the base toward a first direction. The shaft is disposed in the axial hole of the sleeve, such that two ends of the elastic member are respectively abutted against a bottom wall of the gear member and the second end of the shaft, the shaft is rotatable and movable axially, and the at least one protrusion of the shaft is movably retained in the at least one guiding groove.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A transmission device for a photosensitive drum, which is adapted for engagement with a drive member of an electronic image forming apparatus provided with two pillars, the transmission device comprising:

(a) a transmission unit comprising:

a shaft extending along an imaginary axis and having a first end facing toward a first direction, a second end facing toward a second direction opposite to the first direction, and at least one protrusion extending along a radial direction of the shaft; and an engagement structure having a base extending from the first end of the shaft, two engagement blocks helically extending from two opposite sides of the base toward the first direction, and a receiving space defined between the engagement blocks for receiving the drive member;

(b) a sleeve having a main body *having a sidewall along the imaginary axis*, an axial hole defined [through] *by the sidewall of* the main body along the imaginary axis, and at least one guiding groove formed on *the sidewall of* the main body *and being through the sidewall of the main body* and communicated with the axial hole, the shaft of the transmission unit being disposed in the axial hole and capable of rotating and moving axially, and the at least one protrusion of the shaft being movably retained in *and being guided through* the at least one guiding groove;

(c) a gear member for engaging with the photosensitive drum, having a housing defined along the imaginary axis for receiving the main body of the sleeve so that the sleeve is coupled with the gear member unrotatably around the imaginary axis; and (d) an elastic member being disposed in the axial hole of the sleeve and having two ends abutted against a bottom wall of the gear member and the second end of the shaft of the transmission unit, respectively.

2. The transmission device as claimed in claim 1, wherein each engagement block has an outer surface extending towards the imaginary axis toward the first direction, an inner surface facing the receiving space, an inclined top surface at a first junction between the outer surface and the inner surface, an engagement concave at a second junction between the outer surface and the inner surface, and a vertex located between the inclined top surface and the engagement concave, wherein an included angle between an extending direction of the inclined top surface and the imaginary axis is not equal to 90 degrees, and the engagement concaves of the engagement blocks are opened toward opposite directions for allowing the pillars of the drive member to enter the engagement concaves through openings of the engagement concaves.

3. The transmission device as claimed in claim 2, wherein the engagement concave of each engagement block of the transmission unit has a recess and a limiting surface located between the recess and the vertex and inclined from the vertex toward the inclined top surface.

4. The transmission device as claimed in claim 1, wherein the engagement structure of the transmission unit further comprises two guiding blocks extending from two other opposite sides of the base, wherein each said guiding block is provided with a guiding bevel extending towards the imaginary axis toward the first direction.

5. The transmission device as claimed in claim 1, wherein the base of the transmission unit is formed of a plate having an opening defined in a middle portion between the engagement blocks.

6. The transmission device as claimed in claim 1, wherein the at least one guiding groove has a bottom side substantially perpendicular to the imaginary axis, and two lateral sides respectively extending from two ends of the bottom side toward to the first direction.

7. The transmission device as claimed in claim 6, wherein the two lateral sides are gradually merged to define a vertex toward the first direction.

8. The transmission device as claimed in claim 6, wherein the at least one guiding groove further has a top side connected between the two lateral sides.

9. The transmission device as claimed in claim 8, wherein the top side is formed of an arc defining a vertex toward the first direction.

10. The transmission device as claimed in claim 8, wherein the top side is parallel to the bottom side, and each of the two lateral sides has a first portion extending from a respective end of the bottom side and being parallel to the imaginary axis and a sloped portion extending from the first portion toward the imaginary axis, such that a length of the top side is shorter than that of the bottom side.

11. The transmission device as claimed in claim 8, wherein the top side is parallel to the bottom side, and each of the two lateral sides and the bottom side define an angle less than 90 degrees but greater than zero degree, such that a length of the top side is shorter than that of the bottom side.

12. The transmission device as claimed in claim 1, wherein the sleeve further comprises two pillars protruding from the main body.

13. The transmission device as claimed in claim 12, wherein the gear member further has two limiting recesses being communicated with the housing for receiving the pillars of the sleeve.

14. The transmission device as claimed in claim 13, wherein the gear member further has an installation slot communicated with the limiting recesses and opened on the top wall.

15. The transmission device as claimed in claim 1, wherein the sleeve further has a plurality of convexities protruding from the main body, and the gear member further has a coupling portion protruding from the bottom wall toward the top wall; the coupling portion is an annular member having a coupling concave at a center thereof and provided with a plurality of through grooves extending along the imaginary axis; the sleeve is mounted in the coupling concave, and the convexities of the sleeve are inserted into the through grooves of the coupling portion movably.

16. The transmission device as claimed in claim 15, wherein the main body of the sleeve has a bottom end and a plurality of slots concaved from the bottom end; an elastic block is formed between every two adjacent said slots; the convexities of the sleeve are located at the elastic blocks.

17. The transmission device as claimed in claim 15, wherein the coupling portion of the gear member has a top end and a plurality of slots concaved from the top end toward the bottom wall; an elastic block is formed between every two adjacent said slots; and the through grooves of the coupling portion are located at the elastic blocks.

18. The transmission device as claimed in claim 15, wherein a bottom portion of the gear member has a fitting slot, and the bottom wall of the gear member, which is detachably mounted to the bottom portion, has a fitting block inlaid in the fitting slot.

19. The transmission device as claimed in claim 1, wherein the main body of the sleeve has a larger radius section and a smaller radius section extending from the larger radius section; the larger radius section of the sleeve is provided with a plurality of protrusions protruded from the outer surfaces of the larger radius section, and the at least one guiding groove is located at the smaller radius section of the sleeve; the top wall of the gear member has a plurality of slots communicated with the housing; a plurality of limiting grooves formed in the wall of the housing; an elastic block is formed between every two adjacent said slots, and each elastic block has a stair; the larger radius section of the sleeve is limited in the housing by the stairs, and the plurality of protrusions are disposed in the plurality of limiting grooves, respectively.

20. The transmission device as claimed in claim 1, wherein the main body of the sleeve has a larger radius section and a smaller radius section extending from the larger radius section; the larger radius section of the sleeve is provided with a limiting groove, and the at least one guiding groove is located at the smaller radius section of the sleeve; the top wall of the gear member has a plurality of slots communicated with the housing in which a limiting block protrudes; an elastic block is formed between every two adjacent said slots, and each elastic block has a stair; the larger radius section of the sleeve is limited in the housing by the stairs, and the limiting block is disposed in the limiting groove.

21. The transmission device as claimed in claim 1, wherein the shaft of the transmission unit has an opening in which a pin is inserted; the protrusion is a part of the pin sticking out of the opening.

22. The transmission device as claimed in claim 1, wherein the gear member has a top portion, a gear portion extending from the top portion along the imaginary axis toward the second direction, and a bottom portion extending from the gear portion along the imaginary axis toward the second direction.

23. The transmission device as claimed in claim 22, wherein the top portion of the gear member has at least one slot.

24. The transmission device as claimed in claim 1, wherein the elastic member having a larger radius section and a smaller radius section extending from the larger radius section, the larger radius section being disposed in the housing of the gear member and having two ends abutted against the bottom wall of the gear member and the sleeve, respectively, the smaller radius section being disposed in the axial hole of the sleeve and having an end abutted against the second end of the shaft of the transmission unit.

25. A transmission device for a photosensitive drum, comprising:

(a) a shaft having a first end, an opposing second end, and at least one protrusion extending along a radial direction of the shaft;

(b) an engagement portion having a base extending from the first end of the shaft, at least one engagement block helically extending from a side of the base toward a first direction, and a receiving space formed therein;

(c) a sleeve having a main body *having a sidewall along the imaginary axis*, an axial hole defined [through] *by the sidewall of* the main body along an axis, and at least one guiding groove formed on *the sidewall of* the main body *and being through the sidewall of the main body* and communicated with the axial hole, wherein when the shaft is disposed in the axial hole, the shaft is rotatable and movable axially, and the at least one protrusion of the shaft is movably retained in *and being guided through* the at least one guiding groove;

(d) a gear member for engaging with the photosensitive drum, having a housing formed for receiving the main body of the sleeve axially such that the sleeve is coupled with the gear member unrotatably around the axial axis; and (e) an elastic member being disposed in the axial hole of the sleeve and having two ends abutted against a bottom wall of the gear member and the second end of the shaft, respectively.

26. A transmission device for a photosensitive drum, comprising:

(a) a gear member for engaging with the photosensitive drum, having a housing and a sleeve disposed in the housing, wherein the sleeve has a main body *having a sidewall along an axis*, an axial hole defined [through] *by the sidewall of* the main body along [an] *the* axis, and at least one guiding groove formed on *the sidewall of* the main body *and being through the sidewall of the main body* and communicated with the axial hole, and is coupled with the gear member unrotatably around the axis;

(b) an elastic member being disposed in the axial hole of the sleeve; and (c) a transmission unit, comprising:

a shaft having a first end, an opposing second end, and at least one protrusion extending along a radial direction of the shaft; and an engagement structure having a base extending from the first end of the shaft, at least one engagement block helically extending from a side of the base toward a first direction, wherein the shaft is disposed in the axial hole of the sleeve, such that two ends of the elastic member are respectively abutted against a bottom wall of the gear member and the second end of the shaft, the shaft is rotatable and movable axially, and the at least one protrusion of the shaft is movably retained in *and being guided through* the at least one guiding groove.

* * * * *